US011854449B2

(12) United States Patent
Yeo et al.

(10) Patent No.: US 11,854,449 B2
(45) Date of Patent: Dec. 26, 2023

(54) ELECTRONIC DEVICE INCLUDING ROLLABLE DISPLAY HAVING BENDING PARTS

(71) Applicant: Samsung Electronics Co., Ltd., Suwon-si (KR)

(72) Inventors: Hyungsok Yeo, Suwon-si (KR); Valeriy Prushinskiy, Suwon-si (KR); Changryong Heo, Suwon-si (KR); Minwoo Yoo, Suwon-si (KR); Seonho Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/804,019

(22) Filed: May 25, 2022

(65) Prior Publication Data

US 2022/0358865 A1 Nov. 10, 2022

Related U.S. Application Data

(63) Continuation of application No. PCT/KR2022/006467, filed on May 6, 2022.

(30) Foreign Application Priority Data

May 6, 2021 (KR) ........................ 10-2021-0058739

(51) Int. Cl.
*G09G 3/00* (2006.01)
*G06F 1/16* (2006.01)
(52) U.S. Cl.
CPC ........... *G09G 3/035* (2020.08); *G06F 1/1652* (2013.01); *G09G 2380/02* (2013.01)

(58) Field of Classification Search
CPC ... G06F 1/1652; G06F 3/021; G09G 2380/02; G09G 3/035; H05K 5/0018; G09F 9/301; G09F 9/30; H04M 1/0268; H04R 7/045
See application file for complete search history.

(56) References Cited

U.S. PATENT DOCUMENTS

| 9,747,822 B2 | 8/2017 | Lee et al. |
| 10,390,443 B2 | 8/2019 | Kim et al. |
| 2004/0061683 A1* | 4/2004 | Mochizuki .............. G06F 3/021 345/168 |

(Continued)

FOREIGN PATENT DOCUMENTS

| JP | 2021033056 A | 3/2021 |
| KR | 10-2017-0079897 A | 7/2017 |

(Continued)

OTHER PUBLICATIONS

International Search Report and Written Opinion of the International Searching Authority dated Aug. 5, 2022, in connection with International Application No. PCT/KR2022/006467, 9 pages.

*Primary Examiner* — Richard J Hong

(57) ABSTRACT

An electronic device includes: a housing; and a flexible display that includes at least some region that is rolled in a substantially circular shape with respect to a first axis in the internal space of the housing. When the flexible display is drawn out of the housing by a specified movement distance, the flexible display may be bent to interfere with the housing so as not to be introduced into the internal space of the housing.

20 Claims, 14 Drawing Sheets

(56) References Cited

U.S. PATENT DOCUMENTS

| | | | |
|---|---|---|---|
| 2008/0013292 A1* | 1/2008 | Slikkerveer | H04M 1/0268 |
| | | | 361/749 |
| 2016/0005475 A1 | 1/2016 | Hirose et al. | |
| 2016/0054758 A1 | 2/2016 | Han | |
| 2016/0163241 A1* | 6/2016 | Lee | G09F 9/301 |
| | | | 40/584 |
| 2020/0059733 A1* | 2/2020 | Shin | H04R 7/045 |
| 2020/0170129 A1 | 5/2020 | Han et al. | |
| 2020/0301475 A1 | 9/2020 | Hirakata et al. | |
| 2022/0101761 A1* | 3/2022 | Gao | G09F 9/301 |
| 2022/0210935 A1* | 6/2022 | Lee | G06F 1/1652 |
| 2022/0326735 A1* | 10/2022 | Kang | G09F 9/30 |
| 2022/0346249 A1* | 10/2022 | Ahn | H05K 5/0018 |

FOREIGN PATENT DOCUMENTS

| | | |
|---|---|---|
| KR | 10-2018-0027318 A | 3/2018 |
| KR | 10-2020-0048729 A | 5/2020 |
| KR | 10-2021-0046206 A | 4/2021 |
| WO | 2020230956 A1 | 11/2020 |

* cited by examiner

ELECTRONIC DEVICE INCLUDING ROLLABLE DISPLAY HAVING BENDING PARTS

CROSS-REFERENCE TO RELATED APPLICATIONS

This application is a bypass continuation of International Application No. PCT/KR2022/006467, filed May 6, 2022, which claims priority to Korean Patent Application No. 10-2021-0058739, filed May 6, 2021, the disclosures of which are herein incorporated by reference in their entirety.

BACKGROUND

1. Field

Various embodiments of the present document relate to an electronic device including a flexible display.

2. Description of Related Art

Electronic devices are being implemented to provide a larger screen with the advancement of digital technology. For example, an electronic device may include a flexible display, and a part of the flexible display may be drawn out from the internal space of the electronic device to expand the screen.

An electronic device that expands the screen by drawing out the flexible display to the outside requires a structure capable of maintaining the screen expanded state.

Various embodiments of the present document may provide an electronic device including a flexible display that can maintain the screen expanded state (or, pulled-out state of the flexible display).

Technical objectives to be achieved in this document are not limited to those mentioned above, and other technical objectives not mentioned will be understood by those of ordinary skill in the art to which the disclosure belongs from the following description.

SUMMARY

According to an embodiment of this document, an electronic device may include: a housing; and a flexible display that includes at least some region that is rolled in a substantially circular shape with respect to a first axis in the internal space of the housing, wherein, when drawn out of the housing by a specified movement distance, the flexible display may be bent to interfere with the housing so as not to be introduced into the internal space of the housing.

The electronic device including a flexible display according to various embodiments of this document implements a structure that maintains the screen expanded state (or, pulled-out state of the flexible display) by utilizing the flexuosity of the flexible display, which can simplify the structure, reduce cost, or improve usability.

Besides, effects obtainable or predicted by various embodiments of this document may be explicitly or implicitly disclosed in the detailed description of the embodiments of this document.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments disclosed herein will be described with reference to the accompanying drawings.

Figure 1:
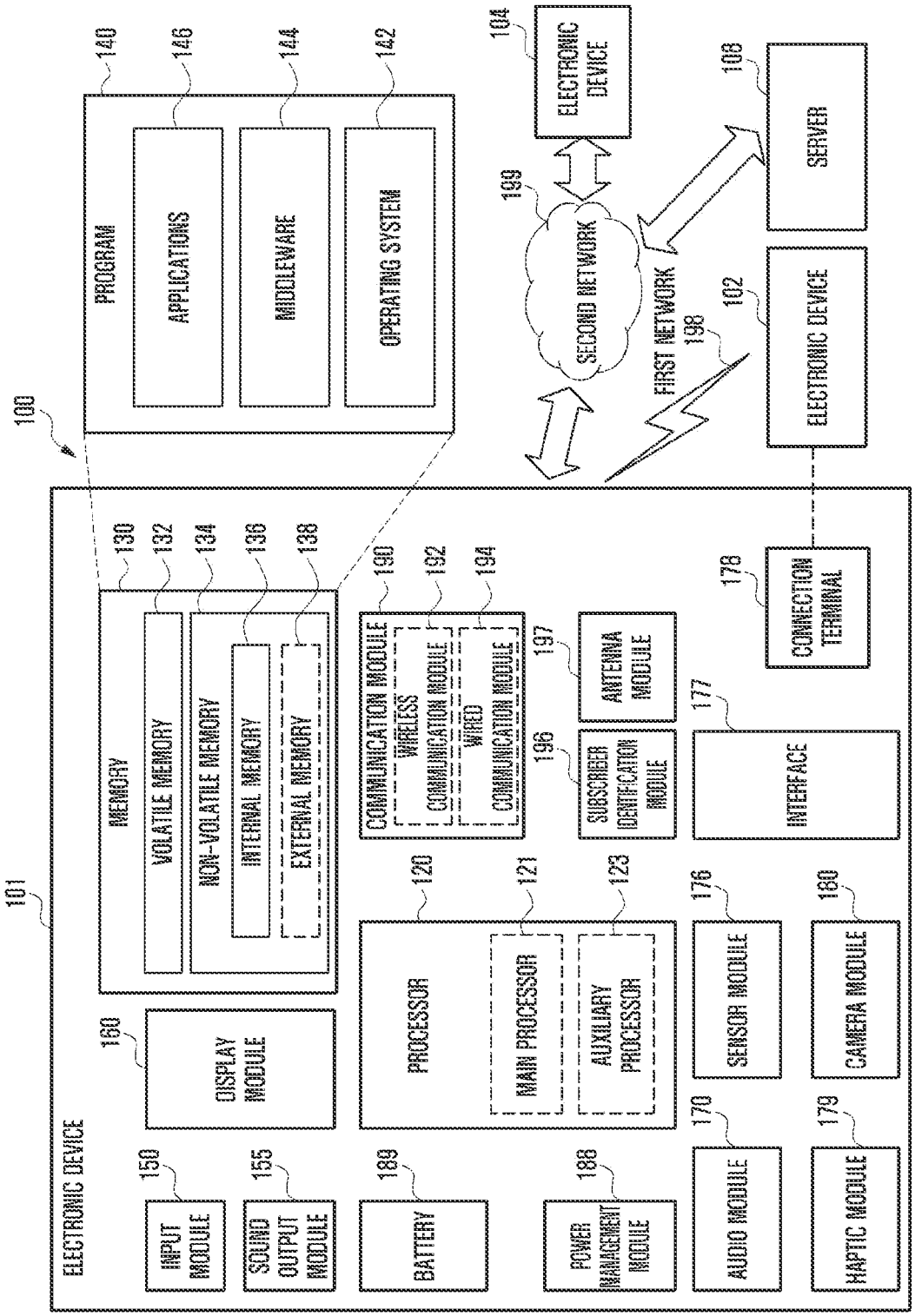
FIG. 1 is a block diagram of an electronic device in a network environment according to an embodiment.

FIG. 1 is a block diagram of an electronic device 101 in a network environment 100 according to an embodiment.

Referring to FIG. 1, the electronic device 101 in the network environment 100 may communicate with an external electronic device 102 via a first network 198 (e.g., a short-range wireless communication network), or at least one of an external electronic device 104 or a server 108 via a second network 199 (e.g., a long-range wireless communication network). The electronic device 101 may communicate with the external electronic device 104 via the server 108. The electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, and/or an antenna module 197. In some embodiments of the disclosure, at least one (e.g., the connection terminal 178) of the components may be omitted from the electronic device 101, or one or more other components may be added in the electronic device 101. In some embodiments of the disclosure, some of the components may be implemented as single integrated circuitry. For example, the sensor module 176, the camera module 180, or the antenna module 197 may be implemented as embedded in single component (e.g., the display module 160).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123. According to an embodiment of the disclosure, the auxiliary processor 123 (e.g., a neural network processing device) may include a hardware structure specified for processing an artificial intelligence model. The artificial intelligence model may be created through machine learning. Such learning may be performed, for example, in the electronic device 101 itself on which the artificial intelligence model is performed, or may be performed through a separate server (e.g., the server 108). The learning algorithms may include, for example, supervised learning, unsupervised learning, semi-supervised learning, or reinforcement learning, but is not limited thereto. The artificial intelligence model may include a plurality of artificial neural network layers. The artificial neural network may be any of a deep neural network (DNN), a convolutional neural network (CNN), a recurrent neural network (RNN), a restricted Boltzmann machine (RBM), a deep belief network (DBN), a bidirectional recurrent DNN (BRDNN), a deep Q-network, or a combination of two or more of the above-mentioned networks, but is not limited the above-mentioned examples. In addition to the hardware structure, the artificial intelligence model may additionally or alternatively include a software structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 and/or the non-volatile memory 134.

The program 140 may be stored in the memory 130 as software, and may include, for example, an operating system (OS) 142, middleware 144, and/or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record, and the receiver may be used for incoming calls. The receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. The display module 160 may include touch circuitry (e.g., a touch sensor) adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. The interface 177 may include, for example, a high-definition multimedia interface (HDMI), a universal serial bus (USB) interface, a secure digital (SD) card interface, and/or an audio interface.

The connecting terminal 178 may include a connector via which the electronic device 101 may be physically connected with the external electronic device (e.g., the external electronic device 102). The connecting terminal 178 may include, for example, an HDMI connector, a USB connector, an SD card connector, and/or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, ISPs, or flashes.

The power management module 188 may manage power supplied to or consumed by the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, and/or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more CPs that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or IR data association (IrDA)) or the second network 199 (e.g., a long-range communication network, such as a legacy cellular network, a 5th generation (5G) network, a next generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4th generation (4G) network, and next-generation communication technology, e.g., new radio (NR) access technology. The NR access technology may support high-speed transmission of high-capacity data (i.e., enhanced mobile broadband (eMBB)), minimization of terminal power and connection of multiple terminals (massive machine type communications (mMTC)), or high reliability and low latency (ultra-reliable and low-latency communications (URLLC)). The wireless communication module 192 may support a high-frequency band (e.g., a mmWave band) to achieve, for example, a high data transmission rate. The wireless communication module 192 may support various technologies for securing performance in a high-frequency band, such as beamforming, massive multiple-input and multiple-output (MIMO), full-dimensional MIMO (FD-MIMO), array antenna, analog beam-forming, or large-scale antenna. The wireless communication module 192 may support various requirements specified in the electronic device 101, an external electronic device (e.g., external the electronic device 104), or a network system (e.g., the second network 199). According to an embodiment of the disclosure, the wireless communication module 192 may support a peak data rate for implementing eMBB (e.g., 20 Gbps or more), loss coverage for implementing mMTC (e.g., 164 dB or less), or U-plane latency for realizing URLLC (e.g., 0.5 ms or less for each of downlink (DL) and uplink (UL) or 1ms or less for round trip).

The antenna module 197 may transmit or receive a signal or power to or from the outside (e.g., the external electronic device) of the electronic device 101. The antenna module 197 may include an antenna including a radiating element including a conductive material or a conductive pattern formed in or on a substrate (e.g., a printed circuit board (PCB)). The antenna module 197 may include a plurality of antennas (e.g., an antenna array). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a PCB, an RFIC that is disposed on or adjacent to a first surface (e.g., the bottom surface) of the PCB and is capable of supporting a predetermined high-frequency band (e.g., a mmWave band), and a plurality of antennas (e.g., array antennas) that is disposed on or adjacent to a second surface (e.g., the top surface or the side surface) of the PCB and is capable of transmitting or receiving a signal of the predetermined high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the external electronic devices 102 or 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide an ultra-low delay service using, for example, distributed computing or MEC. In another embodiment of the disclosure, the external electronic device 104 may include an internet of things (IoT) device. The server 108 may be an intelligent server using machine learning and/or neural networks. According to an embodiment of the disclosure, the external electronic device 104 or the server 108 may be included in the second network 199. The electronic device 101 may be applied to an intelligent service (e.g., smart home, smart city, smart car, or healthcare) based on 5G communication technology or IoT-related technology.

An electronic device according to an embodiment of the disclosure may be one of various types of electronic devices.

The electronic devices may include a portable communication device (e.g., a smartphone), a computer device, a portable multimedia device, a portable medical device, a camera, a wearable device, or a home appliance. However, the electronic device is not limited to any of those described above.

Various embodiments of the disclosure and the terms used herein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). If an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

The term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAY-STORE™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
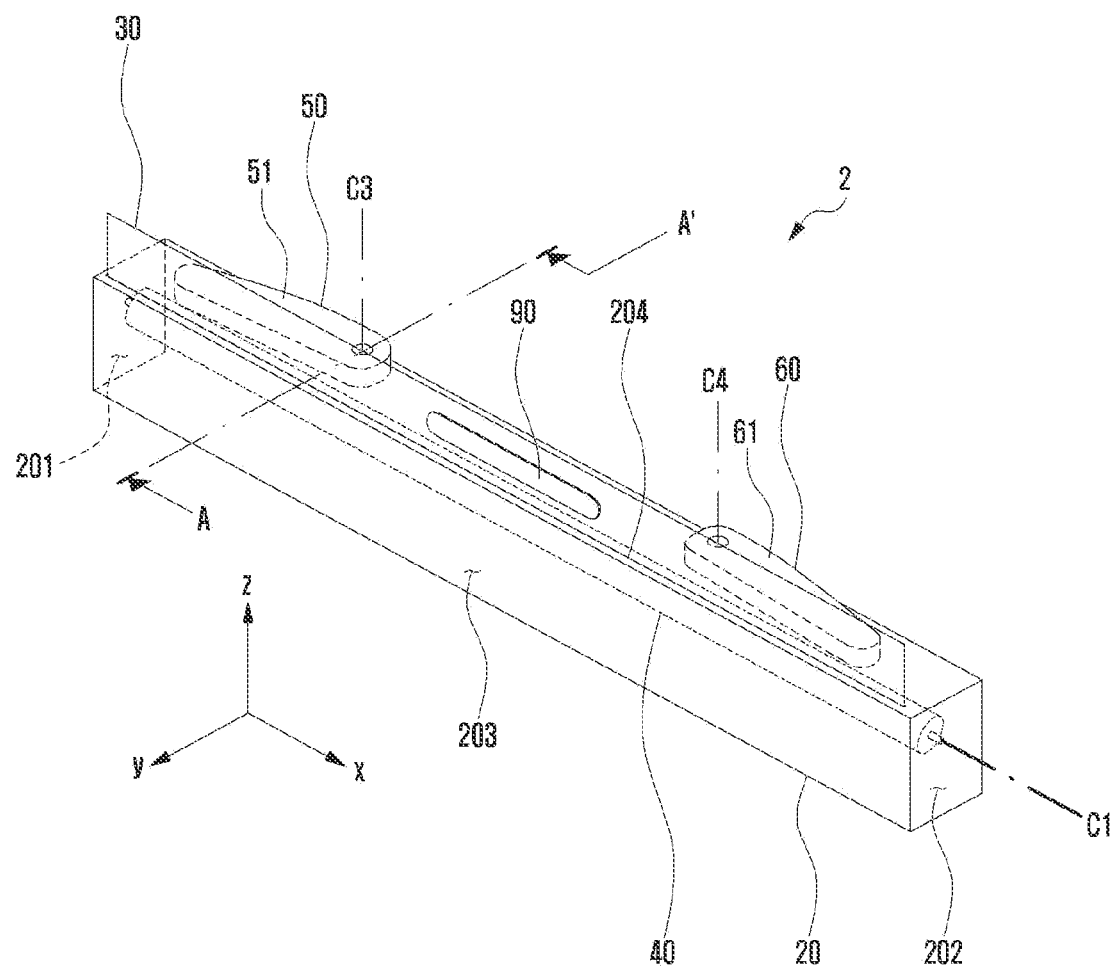
FIG. 2 illustrates an electronic device according to an embodiment.
Figure 3:
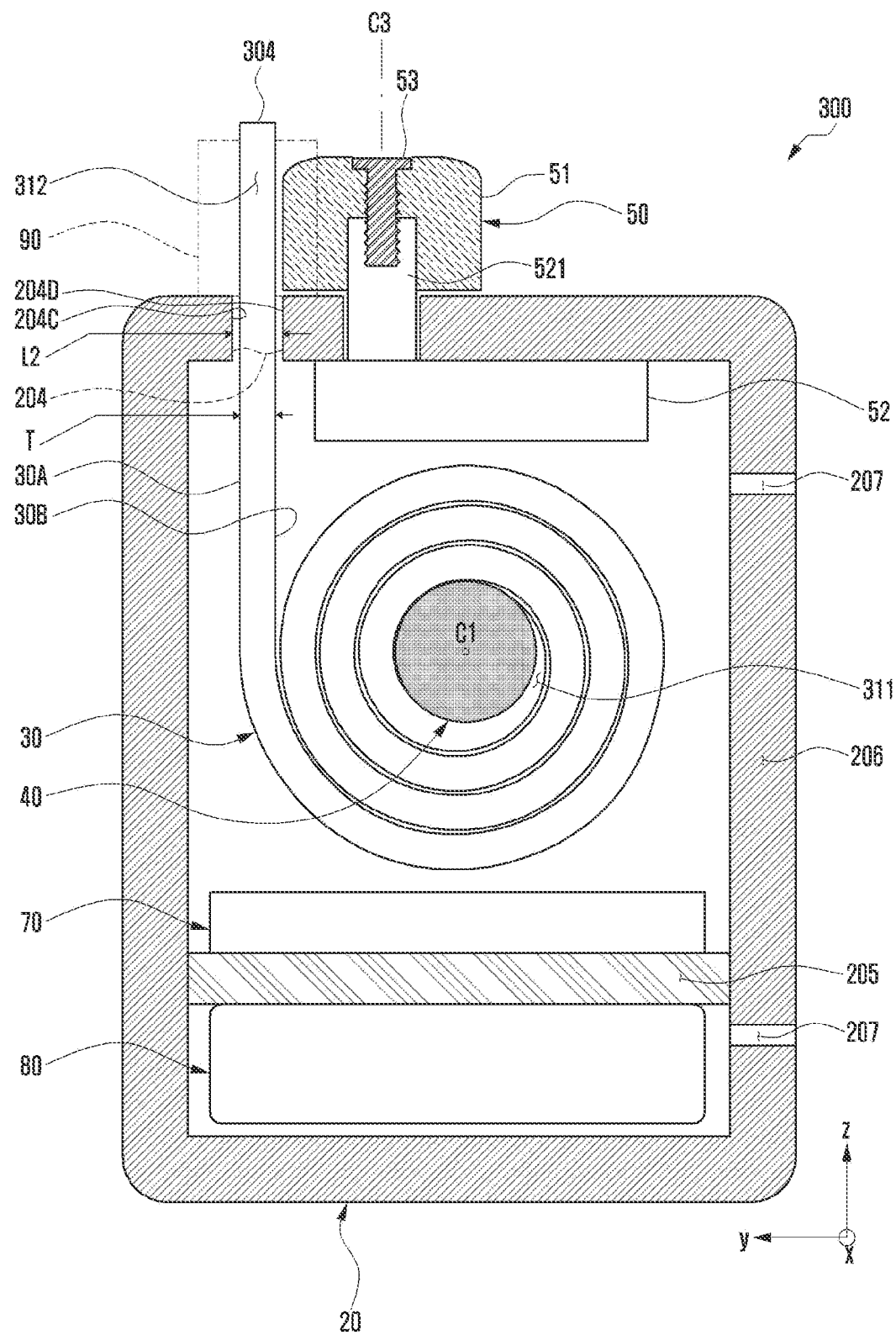
FIG. 3 shows a cross-sectional structure in the y-z plane for a part of the electronic device along line A-A' in FIG. 2 according to an embodiment.
Figure 4:
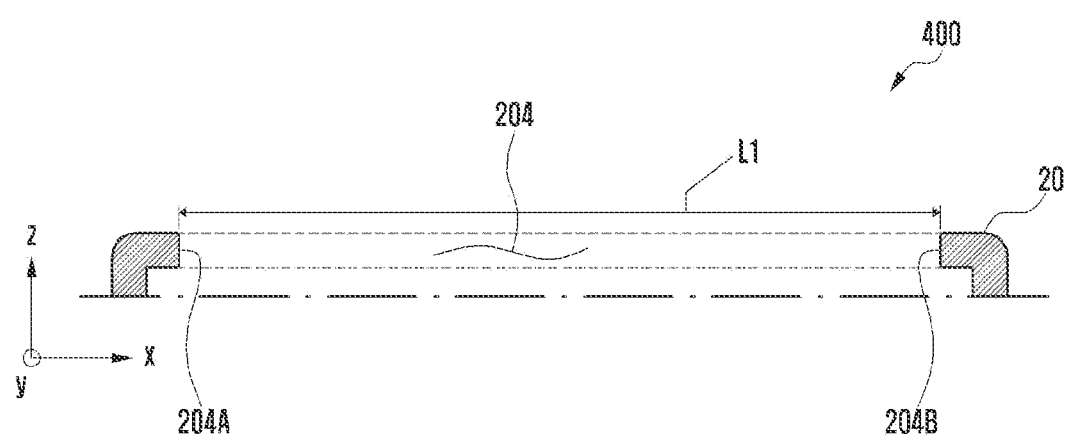
FIG. 4 shows a cross-sectional structure in the x-z plane for a part of the housing in FIG. 2 according to an embodiment.
Figure 5:
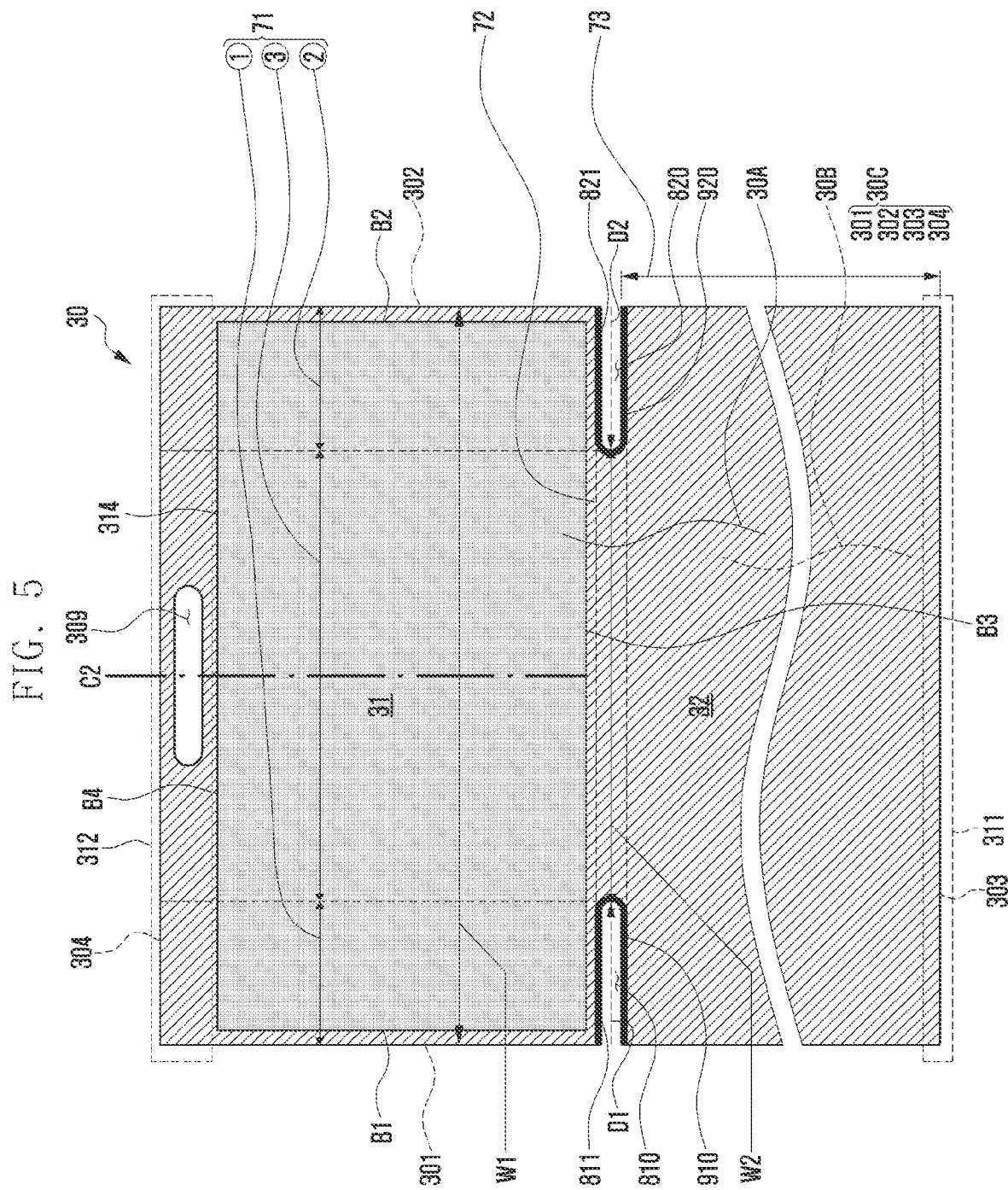
FIG. 5 is a plan view of a flexible display module, in an unfolded state, included in the electronic device of FIG. 2 according to an embodiment.

FIG. 2 illustrates an electronic device 2 according to an embodiment. FIG. 3 shows a cross-sectional structure 300 in the y-z plane for a part of the electronic device 2 along line A-A' in FIG. 2 according to an embodiment. FIG. 4 shows a cross-sectional structure 400 in the x-z plane for a part of the housing 20 in FIG. 2 according to an embodiment. FIG. 5 is a plan view of a flexible display module 30, in an unfolded state, included in the electronic device 2 of FIG. 2 according to an embodiment.

With reference to FIGS. 2 and 3, the electronic device 2 (e.g., electronic device 101 in FIG. 1) may include a housing (or, housing structure) 20, a flexible display module 30, a cylindrical roller 40, a first bending mechanism 50, a second bending mechanism 60, a printed circuit board 70, and/or a battery 80 (e.g., battery 189 in FIG. 1).

FIG. 2 illustrates the electronic device 2 in a first state. The first state of the electronic device 2 may indicate, for example, a state in which the flexible display module 30 is moved into the internal space of the housing 20 by an amount (such as to the maximum) so that the display area (or screen) viewed from the outside is reduced. In one embodiment, in the first state of the electronic device 2, the display area visible to the outside may be substantially not formed as illustrated. In a certain embodiment, the electronic device 2 may be implemented such that the display area visible to the outside is formed in the first state. The first state of the electronic device 2 may be referred to as various other terms (e.g., closed state) corresponding to a state in which the flexible display module 30 is not drawn out of the housing 20.

At least a portion of the flexible display module 30 may be introduced (e.g., inserted) into the internal space of the housing 20 while being circularly rolled around a first axis C1 (e.g., rolling axis). In one embodiment, the housing 20 may include a first surface 201 and a second surface 202 positioned to be spaced apart in a direction in which the first axis C1 extends (e.g., x-axis direction). The first surface 201 may face in a first direction (e.g., −x axis direction) and constitute one surface of the electronic device 2, and the second surface 202 may face in a second direction (e.g., +x axis direction) opposite to the first direction and constitute the other surface of the electronic device 2. The housing 20 may include a third surface 203 (e.g., lateral surface or side surface) of the electronic device 2 that surrounds a space between the first surface 201 and the second surface 202. The housing 20 may include an opening 204 located on the third surface 203, and the flexible display module 30 may be introduced into the internal space of the housing 20 or may be drawn out of the housing 20 through the opening 204. In a certain embodiment, the housing 20 may refer to a structure that includes at least a portion of the first surface 201, the second surface 202, and the third surface 203. For example, the housing 20 may include a plurality of housing parts coupled to each other to form the external surface of the electronic device 2.

According to an embodiment, the cylindrical roller 40 may be positioned inside the housing 20 to be rotatable about the first axis C1. When the flexible display module 30 is introduced into the internal space of the housing 20 or is drawn out of the housing 20 through the opening 204, there may be a transition between the movement of the flexible display module 30 and the rotational motion of the cylindrical roller 40. For example, when the flexible display module 30 is introduced into the internal space of the housing 20, at least a portion of the flexible display module 30 may be introduced into the internal space of the housing 20 while being rolled on the cylindrical outer surface of the cylindrical roller 40 rotating about the first axis C1. The cylindrical outer surface of the cylindrical roller 40 may be a circular outer peripheral surface (e.g., cylindrical surface) spaced apart from the first axis C1 by a corresponding radius.

According to an embodiment, the electronic device 2 may include a driving module (not shown) related to rotation of the cylindrical roller 40 or movement of the flexible display module 30. The driving module may, for example, cause the cylindrical roller 40 to rotate to thereby contribute to the movement of the flexible display module 30. As another example, the driving module may cause the flexible display module 30 to move, and the cylindrical roller 40 may be rotated accordingly. In one embodiment, the driving module may include an elastic structure that applies an elastic force to the cylindrical roller 40 to cause the cylindrical roller 40 to rotate or the flexible display module 30 to move. For example, the elastic structure included in the driving module may cause the cylindrical roller 40 to rotate or the flexible display module 30 to move without an electric driving device such as a motor.

According to an embodiment, the flexible display module 30 (see FIGS. 3 and 5) may include a front surface 30A, a rear surface 30B facing in the opposite direction to the front surface 30A, and a side surface 30C connecting the front surface 30A and the rear surface 30B. Light generated by a display panel included in the flexible display module 30 may travel through the front surface 30A to the outside. The side surface 30C of the flexible display module 30 may include a first side surface 301, a second side surface 302, a third side surface 303, or a fourth side surface 304. The first side surface 301 and the second side surface 302 may be located respectively on opposite sides. The third side surface 303 and the fourth side surface 304 may be located respectively on opposite sides. The third side surface 303 may connect one end of the first side surface 301 and one end of the second side surface 302. The fourth side surface 304 may connect the other end of the first side surface 301 and the other end of the second side surface 302. The first end 311 forming the third side surface 303 of the flexible display module 30 may be connected to the cylindrical roller 40. The second end 312 forming the fourth side surface 304 of the flexible display module 30 may be positioned at the outside through the opening 204 of the housing 20 in the first state of the electronic device 2.

According to an embodiment, a handle 90 (refer to FIGS. 2 and 3) may be positioned at the second end 312 of the flexible display module 30. The handle 90 may be used when the user pulls the flexible display module 30 to take out the flexible display module 30 from the inside of the housing 20 to the outside of the housing 20. The handle 90 may be coupled to an opening 309 (see FIG. 5) formed in, for example, the non-display area 32. The handle 90 may be implemented as a flexible member so as not to impair the flexuosity of the flexible display module 30. In a certain embodiment (not shown), the electronic device 2 may be implemented such that the second end 312 is not exposed to the outside of the housing 20 and the handle 90 is exposed to the outside in the first state of the electronic device 2.

According to an embodiment, the surface of the opening 204 formed in the housing 20 may include a first inner surface 204A, a second inner surface 204B, a third inner surface 204C, or a fourth inner surface 204D. The first inner surface 204A may face the first side surface 301 of the flexible display module 30. The second inner surface 204B may face the second side surface 302 of the flexible display module 30. The third inner surface 204C may face the front surface 30A of the flexible display module 30. The fourth inner surface 204D may face the rear surface 30B of the flexible display module 30. The third inner surface 204C and the fourth inner surface 204D may be located respectively on opposite sides. The first inner surface 204A may connect one end of the third inner surface 204C and one end of the fourth inner surface 204D. The second inner surface 204B is located on the opposite side of the first inner surface 204A, and may connect the other end of the third inner surface 204C and the other end of the fourth inner surface 204D. A first distance L1 between the first inner surface 204A and the second inner surface 204B may be formed to be greater than a first width W1 between the first side surface 301 and the second side surface 302. A second distance L2 between the third inner surface 204C and the fourth inner surface 204D may be formed to be greater than the thickness T of the flexible display module 30 (e.g., distance between the front surface 30A and the rear surface 30B).

According to an embodiment, the flexible display module 30 may include a display area (or, active area) 31 and a non-display area (or, non-active area) 32. The display area 31 is a section forming the screen of the electronic device 2 and may include a light emitting layer (e.g., organic light emitting diode (OLED) or micro light emitting diode (micro LED)) including a plurality of pixels. In one embodiment, the display area 31 may be at least partially surrounded by the non-display area 32. For example, a first boundary B1, a second boundary B2, a third boundary B3, or a fourth boundary B4 may exist between the display area 31 and the non-display area 32. The first boundary B1 may be positioned adjacent to, for example, the first side surface 301 and be substantially parallel to the first side surface 301. The second boundary B2 may be positioned adjacent to, for example, the second side surface 302 and be substantially parallel to the second side surface 302. The first boundary B1 and the second boundary B2 may be extended with a specific separation distance. The third boundary B3 may connect, for example, one end of the first boundary B1 and one end of the second boundary B2. The fourth boundary B4 may connect, for example, the other end of the first boundary B1 and the other end of the second boundary B2. The third boundary B3 and the fourth boundary B4 can be extended with a specific separation distance.

In one embodiment, the flexible display module 30 may include a first part 71, a second part 72, and a third part 73. The second part 72 may connect the first part 71 and the third part 73. The first part 71 is a part substantially drawn out of the housing 20 of the flexible display module 30, and the display area 31 may be included in the first part 71. The third part 73 may be connected to the cylindrical roller 40 (see FIG. 3). The first part 71 and/or the third part 73 may be formed to have a first width W1 between the first side surface 301 and the second side surface 302. In one embodiment, the second part 72 may be formed to have a second width W2 smaller than the first width W1. Hereinafter, the first part 71 may be referred to as a screen part, and the second part 72 may be referred to as a neck part of the flexible display module 30.

According to an embodiment, the flexible display module 30 may include a first notch 810 and/or a second notch 820 formed in the non-display area 32. The first notch 810 may be, for example, a first opening penetrating between the front surface 30A and the rear surface 30B of the flexible display module 30, and may indicate a recessed or concavely cut portion in the first side surface 301. The second notch 820 may be, for example, a second opening penetrating between the front surface 30A and the rear surface 30B of the flexible display module 30, and may indicate a recessed or concavely cut portion in the second side surface 302. The neck part 72 may include a portion between the first notch 810 and the second notch 820 in the flexible display module 30. In a certain embodiment, the first notch 810 may be referred to as a first side cut, and the second notch 820 may be referred to as a second side cut.

According to an embodiment, when viewed from above the front surface 30A of the flexible display module 30 in the unfolded state, the first notch 810 and the second notch 820 may be formed to be symmetrical to each other. For example, a first depth D1 in which the first notch 810 is dug in a direction from the first side surface 301 to the second side surface 302 may be substantially the same as a second depth D2 in which the second notch 820 is dug in a direction from the second side surface 302 to the first side surface 301.

According to an embodiment, the screen part 71 of the flexible display module 30 may include a first region ①, a second region ②, and a third region ③ between the first region ① and the second region ②. The first region ① may include a portion of the screen part 71 corresponding to the first notch 810. The first region ① may include a first display area (not shown) of the display area 31. The first region ① may include a first rim 811 positioned between the first region ① and the first notch 810. The first rim 811 may form an inner surface of the first notch 810. The second region ② may include a portion of the screen part 71 corresponding to the second notch 820. The second region ② may include a second display area (not shown) of the display area 31. The second region ② may include a second rim 821 positioned between the second region ② and the second notch 820. The second rim 821 may form an inner surface of the second notch 820. The first rim 811 and the second rim 821 may be parallel to the third boundary B3 of the display area 31. When viewed from above the front surface 30A of the flexible display module 30 in the unfolded state, the distance between the first rim 811 and the third boundary B3 may be the same as the distance between the second rim 821 and the third boundary B3. The third region ③ may be connected to the neck part 72 and may include a third display area (not shown) among the display area 31. In one embodiment, when viewed from above the front surface 30A of the flexible display module 30 in the unfolded state, the first display area included in the first region ① and the second display area included in the second region ② may be arranged to be symmetrical to each other with the third display area included in the third region ③ interposed therebetween.

According to an embodiment, when the flexible display module 30 is drawn out of the housing 20 so that the display area 31 is fully exposed to the outside, the neck part 72 is positioned at the opening 204 (see FIG. 3) of the housing 20. When the flexible display module 30 is drawn out of the housing 20 so that the display area 31 is fully exposed to the outside, the first rim 811 may be located outside the housing 20, and the first region ① of the flexible display module 30 may be placed in a state where the first region ① can be bent in a direction perpendicular to the first axis C (e.g., y-axis direction in FIG. 2 or 3) without interference of the housing 20. When the flexible display module 30 is drawn out of the housing 20 so that the display area 31 is fully exposed to the outside, the second rim 821 may be located outside the housing 20, and the second region ② of the flexible display module 30 may be placed in a second state where the second region ② can be bent in a direction perpendicular to the first axis C (e.g., y-axis direction in FIG. 2 or 3) without interference of the housing 20.

Figure 6:
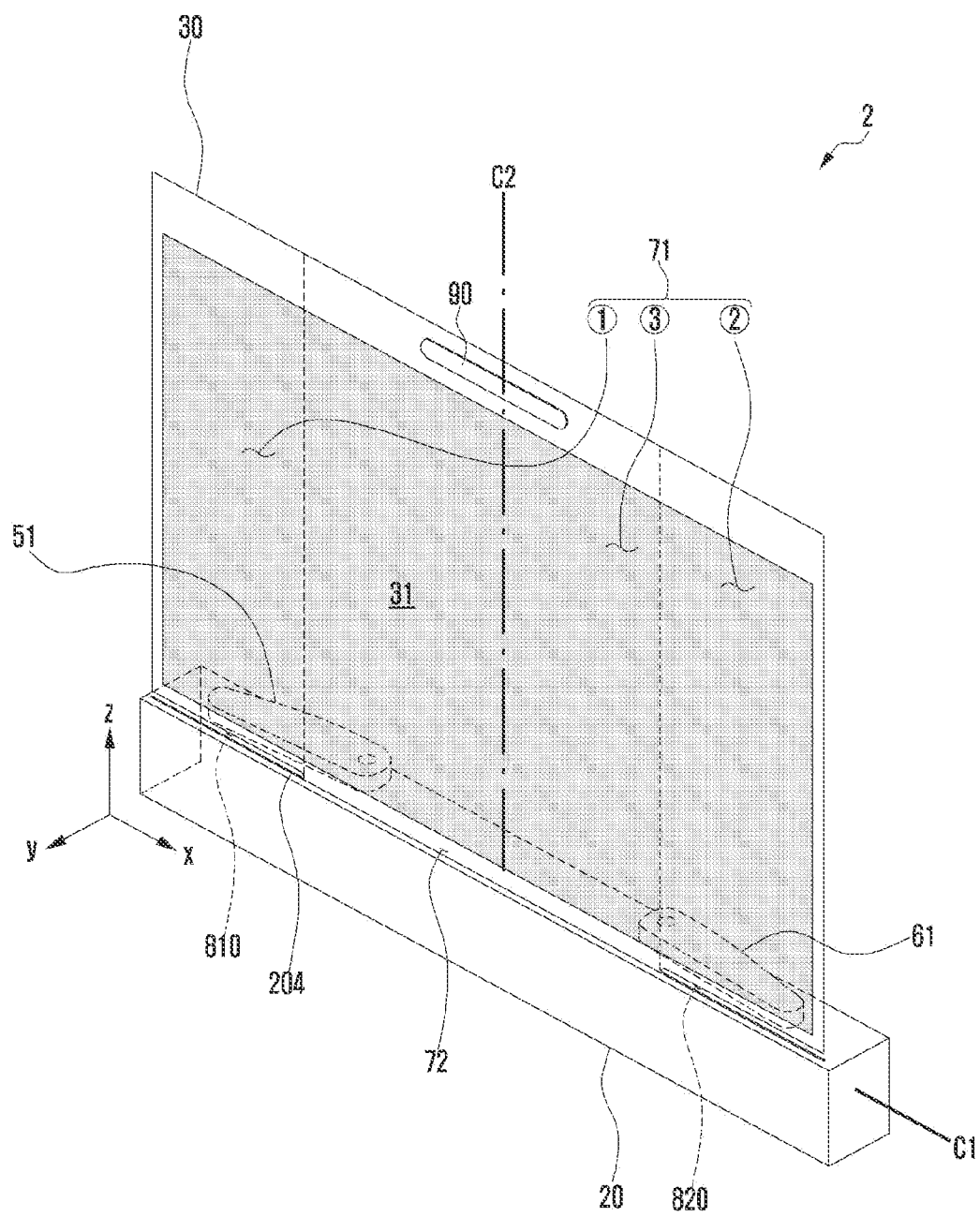
FIG. 6 illustrates the electronic device in a second state where the screen part of the flexible display module is drawn out of the housing according to an embodiment.
Figure 7:
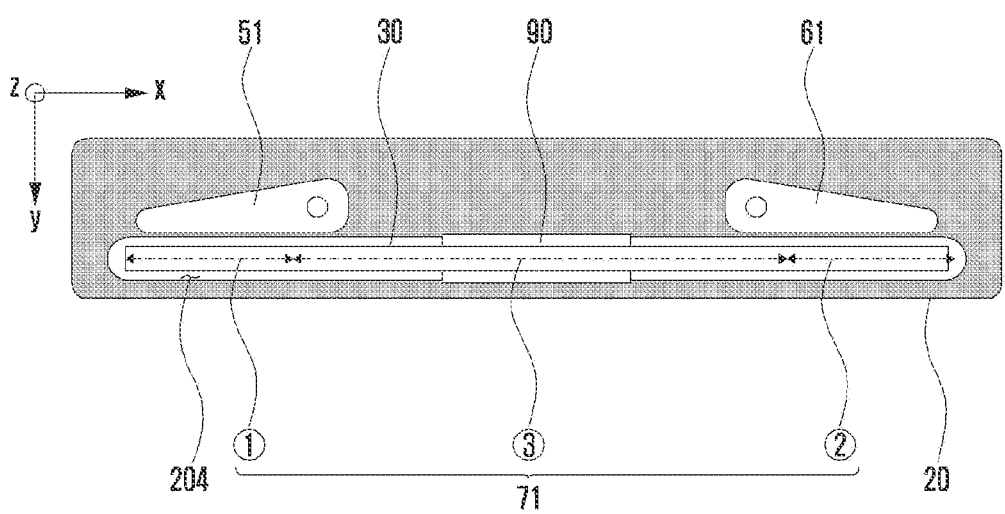
FIG. 7 is a plan view in the x-y plane for the electronic device in the example of FIG. 6 according to an embodiment.

FIG. 6 illustrates the electronic device 2 in a second state where the screen portion 71 of the flexible display module 30 is drawn out of the housing 20 according to an embodiment. FIG. 7 is a plan view in the x-y plane for the electronic device 2 in the example of FIG. 6 according to an embodiment. With reference to FIGS. 6 and 7, by applying an external force to the handle 90, the flexible display module 30 may be drawn out from the inside of the housing 20 to the outside, and the electronic device 2 may be transitioned from the first state of FIG. 2 to the second state of FIG. 6. The second state may refer to a state in which the flexible display module 30 is maximally drawn out of the housing 20 so that the display area 31 is no longer expanded and is substantially arranged in a flat shape. For example, due to the elasticity of the flexible display module 30, the screen part 71 drawn out of the housing 20 may be disposed in a substantially flat shape. In one embodiment, when the external force to draw the flexible display module 30 out of the housing 20 is removed, the electronic device 2 may be transitioned from the second state of FIG. 6 to the first state of FIG. 2. For example, the electronic device 2 may include a driving module operably connected to the cylindrical roller 40 or the flexible display module 30, and the driving module may maintain a force to introduce the flexible display module 30 into the internal space of the housing 20. The driving module may include an elastic structure using an elastic member such as a torsion spring. The elastic structure may elastically maintain a force for introducing the flexible display module 30 into the internal space of the housing 20. When the external force to withdraw the flexible display module 30 out of the housing 20 disappears, the electronic device 2 may be transitioned from the second state of FIG. 6 to the first state of FIG. 2 due to the driving module (automatic transition).

With reference to FIGS. 2 and 3, in one embodiment, the first bending mechanism 50 may bend the first region ① of the flexible display when the flexible display module 30 is drawn out of the housing 22 so that the display area 31 is fully exposed to the outside. The first bending mechanism 50 may include, for example, a first rotation member 51 and a first driving part 52 (e.g., first driving unit or first driving module) connected to the first rotation member 51. The first rotation member 51 may be rotated by the first driving part 52 to press and bend the first region ① of the flexible display module 30. In the second state shown in FIG. 6, the first rotation member 51 may be positioned to press a section included in the first region ① of the rear surface 30B of the flexible display module 30 in a rotational manner. In one embodiment, the shaft 521 of the first driving part 52 located inside the housing 20 may pass through a hole formed in the housing 20 and be connected to the first rotation member 51 located outside the housing 20 by using a screw (or bolt) 53. When the first driving part 52 rotates the shaft 521, the first rotation member 51 may be rotated. When the display area 31 is fully drawn out of the housing 20 through the opening 204, the second bending mechanism 60 may bend the second region ② of the flexible display module 30 corresponding to the second notch 520. The second bending mechanism 60 may be implemented in substantially the same way as the first bending mechanism 50, and may include, for example, a second rotation member 61 and a second driving part (e.g., second driving unit or second driving module) connected to the second rotation member 61. The first rotation member 51 may be rotated with respect to a third axis C3, and the second rotation member 61 may be rotated with respect to a fourth axis C4 spaced apart from the third axis C3. The third axis C3 and the fourth axis C4 may be perpendicular to the first axis C1. The printed circuit board 70 positioned inside the housing 20 may be electrically connected to the first driving part 52 and the second driving part through an electrical path such as a flexible printed circuit board. When the display area 31 is fully drawn out of the housing 20 through the opening 204, a control circuit (e.g., processor 120 in FIG. 1) disposed on the printed circuit board 70 may control the first bending mechanism 50 so that the first region ① of the flexible display module 30 can be disposed to be bent and/or control the second bending mechanism 60 so that the second region 02 of the flexible display module 30 can be disposed to be bent. The first driving part 52 may include a motor operably connected to the shaft 521, and a motor driving circuit (e.g., motor controller or motor driver) electrically connected to the motor. The motor driving circuit may control the motor based on a control signal received from the processor (e.g., processor 120 in FIG. 1). The motor driving circuit may include a motor encoder for detecting a driving state of the motor. The motor encoder may include, for example, a disk coupled to the rotation shaft of the motor, and a detector capable of detecting the rotation direction, rotation angle, rotation amount, rotation speed, rotation acceleration, or rotation angular velocity of the rotation shaft by marking electronically recognizable scales and marks on the disk. The processor may control the motor driving circuit based on instructions stored in the memory (e.g., memory 130 in FIG. 1). The second driving part included in the second bending mechanism 60 may be implemented in substantially the same manner as the first driving part. The control circuit (e.g., processor 120 in FIG. 1) electrically connected to the first driving part 52 and the second driving part may identify a state where the flexible display module 30 is drawn out of the housing 22 so that the display area 31 is fully exposed to the outside by using various sensors (e.g., acceleration sensor, geomagnetic sensor, optical sensor, magnetism detection sensor) or various current carrying structures (e.g., electrical contacts).

Figure 8:
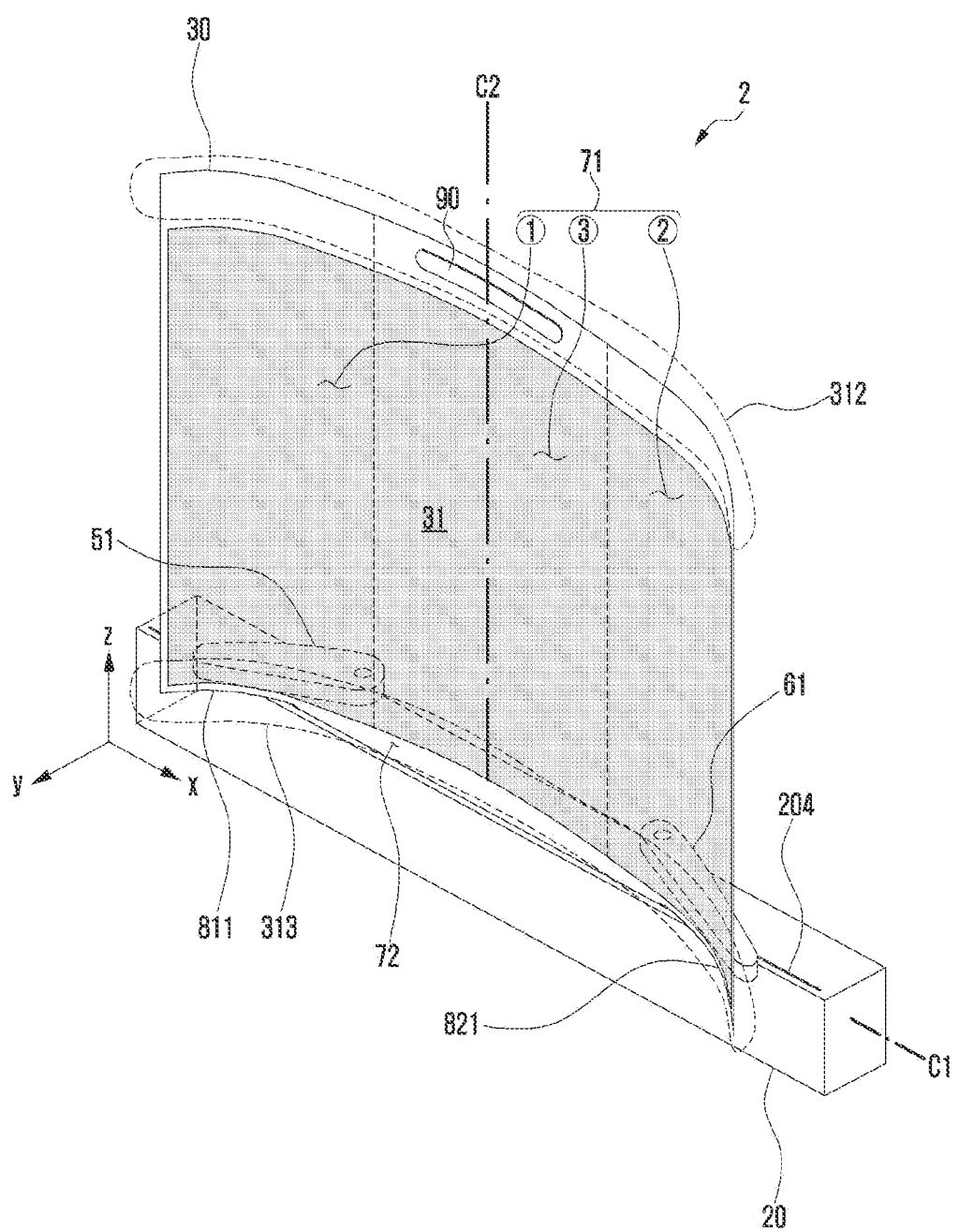
FIG. 8 illustrates the electronic device in a third state where the screen part of the flexible display module drawn out of the housing is disposed to be bent according to an embodiment.
Figure 9:
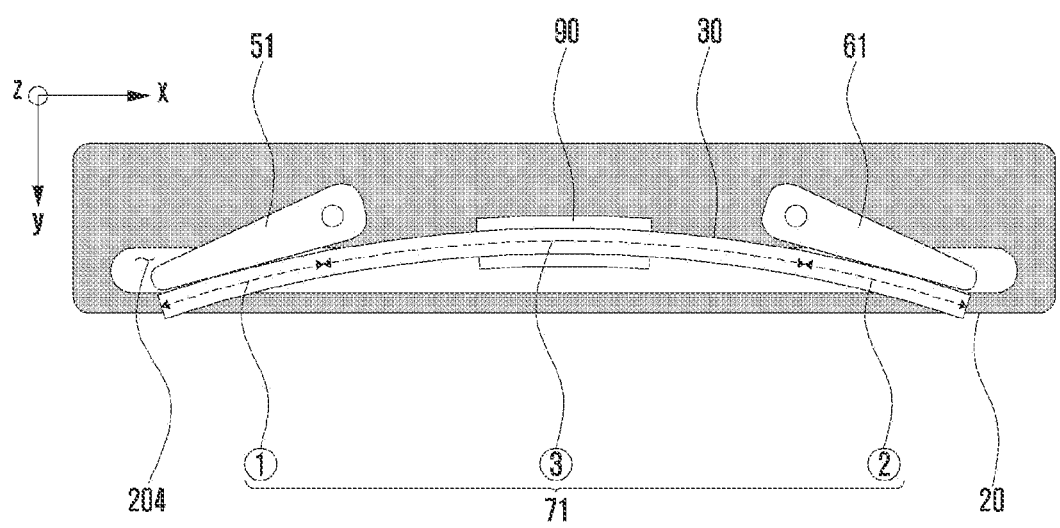
FIG. 9 is a plan view in the x-y plane for the electronic device in the example of FIG. 8 according to an embodiment.

FIG. 8 illustrates the electronic device 2 in a third state where the screen part 71 of the flexible display module 30 drawn out of the housing 20 is disposed to be bent according to an embodiment. FIG. 9 is a plan view in the x-y plane for the electronic device 2 in the example of FIG. 8 according to an embodiment. With reference to FIGS. 8 and 9, the electronic device 2 may be transitioned from the second state of FIG. 6 to the third state of FIG. 8 by rotating the first rotation member 51 and the second rotation member 61. The third state may refer to a state where the flexible display module 30 is maximally drawn out of the housing 20 so that the display area 31 is no longer expanded, and the display area 31 is disposed in a curved shape. In the third state, the screen part 71 of the flexible display module 30 may be bent with respect to the second axis C2 (see FIGS. 6 and 8) (e.g., curvature axis) perpendicular to the first axis C1 (FIG. 2 or 6). The second axis C2 may be a virtual line passing through the center of the display area 31. For example, when viewed from above the front surface 30A of the flexible display module 30 in the unfolded state (see FIG. 5), the distance between the second axis C2 and the first boundary B1 may be substantially the same as the distance between the second axis C2 and the second boundary B2. In one embodiment, in the third state, the interference between the first rim 811 and the housing 20 and/or the interference between the second rim 821 and the housing 22 may prevent the screen part 71 of the flexible display module 30 from being introduced into the internal space of the housing 20. In one embodiment, when the first region ① of the screen part 71 is bent by the first rotation member 51 and the second region ② of the screen part 71 is bent by the second rotation member 61, a force may be transferred to the third region ③ of the screen part 71, and the third region ③ may be bent with respect to the second axis C2 to be smoothly arranged with the first region ① and the second region ②. With reference to FIG. 3, the opening 204 of the housing 20 may have a space allowing the third region ③ to be bent. For example, a second distance L2 between the third inner surface 204C and the fourth inner surface 204D of the opening 204 may be formed in correspondence to the bending of the third region ③.

According to an embodiment, when the first region ① of the screen part 71 is bent by the first rotation member 51 and the second region ② of the screen part 71 is bent by the second rotation member 61, due to transmission of a force or motion, the screen part 71 may be bent in a specific bending form in a direction of the second axis C2. For example, the second end 312 of the screen part 71 may be bent in substantially the same bending shape as the section 313 of the screen part 71 pressed by the first rotation member 51 and the second rotation member 61.

According to a certain embodiment, when the first region ① of the screen part 71 is bent by the first rotation member 51 and the second region ② of the screen part 71 is bent by the second rotation member 61, a rigid structure responding to the elasticity of the screen part 71 may be implemented. The rigid structure may contribute to bending the screen part 71 in a specific bending shape in a direction of the second axis C2. For example, the support structure included in the flexible display module 30 (e.g., display support structure 1130 in FIG. 12 or 13) may include one or more inner cores extended in the direction of the second axis C2. In one embodiment, with reference to FIG. 3, a first inner core may be positioned in the non-display area 32 in correspondence to the first side surface 301, and a second inner core may be positioned in the non-display area 32 in correspondence to the second side surface 302.

In a certain embodiment, a separate fixing member (or support member) that can be coupled to the second end 312 of the screen part 71 may be implemented. The fixing member (e.g., cap) may make a contribution so that the second end 312 may remain in substantially the same bending shape as the section 313 of the screen part 71 pressed by the first rotation member 51 and the second rotation member 61.

According to an embodiment, when a signal (e.g., signal through a hardware button or a software button provided on the screen) is generated through an input device included in the electronic device 2, the electronic device 2 may be transitioned from the third state of FIG. 8 via the second state of FIG. 6 to the first state of FIG. 2. In a certain embodiment, when a signal is generated from various sensors such as a pressure sensor, the electronic device 2 may be transitioned from the third state of FIG. 8 via the second state of FIG. 6 to the first state of FIG. 2. For example, when the first rotation member 51 and the second rotation member 61 return to the first state (see FIG. 2) being the initial state, the screen part 71 of the flexible display module 30 may return to a flat state due to elasticity and may be introduced into the internal space of the housing 20 due to the driving module (e.g., elastic structure).

With reference to FIG. 5, in one embodiment, the flexible display module 30 may include a first reinforcing member (or, protection member) 910 disposed in the first notch 710. The first reinforcing member 910 may be at least partially disposed along the surface of the first notch 810. The first reinforcing member 910 may be implemented to reduce a decrease in flexuosity of the flexible display module 30. The first reinforcing member 910 may include, for example, a coating layer. In a certain embodiment, the first reinforcing member 910 may include a film adhered using an adhesive material. In a certain embodiment, the first reinforcing member 910 may be separately prepared and disposed or coupled to the first notch 810. The first reinforcing member 910 may include, for example, a metal or a polymer. The first reinforcing member 910 may contribute to preventing the flexible display module 30 from being damaged by reducing the stress generated in the first notch 810 or the neck part 72 when a force or motion is transferred to the flexible display module 30. The flexible display module 30 may include a second reinforcing member (or second protection member) 920 disposed in the second notch 820, and the second reinforcing member 920 may be formed in substantially the same manner as the first reinforcing member 910 for the first notch 810. The second reinforcing member 920 may contribute to preventing the flexible display module 30 from being damaged by reducing the stress generated in the second notch 820 or the neck part 72 when a force or motion is transferred to the flexible display module 30.

With reference to FIG. 2, the electronic device 2 may be, for example, the electronic device 101 in FIG. 1 or may include at least one of the components (e.g., processor 120, memory 130, input module 150, sound output module 155, display module 160, audio module 170, sensor module 176, interface 177, connection terminal 178, haptic module 179, camera module 180, power management module 188, battery 189, communication module 190, subscriber identification module 196, and antenna module 197) included in the electronic device 101 in FIG. 1. In a certain embodiment, some of the components illustrated in FIG. 1 may be omitted from the electronic device 2 or other components may be additionally included in the electronic device 2. The position or number of components included in the electronic device 2 may vary without being limited to the illustrated example. At least one component may be disposed on the printed circuit board 70 or may be electrically connected to the printed circuit board 70 through an electrical path (e.g., flexible printed circuit board or cable). For example, the electronic device 2 may include a support structure (or support member) 205 positioned between the printed circuit board 70 and the battery 80 inside the housing 20, and the printed circuit board 70 and the battery 80 may be electrically connected through various current carrying structures (e.g., current carrying through a flexible printed circuit board, or current carrying through physical contacts). The support structure 205, as a portion (e.g., bracket or mounting plate) on which components are arranged inside the housing 20, may contribute to the durability or rigidity (e.g., torsional strength) of the electronic device 2. The support structure 205 may be connected to the housing 20 or may be integrally formed with at least a portion of the housing 20, and may include a metal and/or a polymer. As another example, a section 206 of the housing 20 may be electrically connected to a wireless communication module (e.g., wireless communication module 192 in FIG. 1) disposed on the printed circuit board 70 and may operate as an antenna radiator.

According to a certain embodiment (not shown), the battery 80 may be located in an inner space in which the flexible display module 30 is rolled. For example, the cylindrical roller 40 may include a cylindrical outer surface on which the flexible display module 30 may be positioned in a rolled state, and a cylindrical inner surface positioned on the opposite side of the cylindrical outer surface. The cylindrical roller 40 may include, for example, a hollow extended from a first opening on one side to a second opening on the other side. The cylindrical roller 40 may include a first cover part that covers the first opening and is rotatably connected to the housing 20, and a second cover part that covers the second opening and is rotatably connected to the housing 20. The battery 80 may be located in an inner space (e.g., hollow) of the cylindrical roller 40, which is a space defined by the cylindrical inner surface of the cylindrical roller 40. The cylindrical roller 40 may be referred to as various other terms, such as a hollow cylinder or a cylindrical shell. The cylindrical inner surface may have a shape corresponding to the inner space of the cylindrical roller 40 in which the battery 80 is accommodated. For example, the battery 80 may be in the form of a cylinder, and the cylindrical inner surface of the cylindrical roller 40 may be parallel to the cylindrical outer surface of the battery 80 or the cylindrical outer surface of the cylindrical roller 40. The cylindrical inner surface of the cylindrical roller 40 is not limited to a circular surface and may be formed in various other shapes capable of supporting the battery 80. In one embodiment, when the flexible display module 30 is introduced into or drawn out of the housing 20 through the opening 204, the battery 80 may be rotated together with the cylindrical roller 40. For example, the battery 80 may be fitted into the inner space of the cylindrical roller 40, and a rotating body including the cylindrical roller 40 and the battery 80 may be formed. As another example, an adhesive material may be positioned between the battery 80 and the cylindrical roller 40, and a rotating body including the cylindrical roller 40 and the battery 80 may be formed. In one embodiment, the rotating body including the cylindrical roller 40 and the battery 80 may be implemented by balancing the weight about the first axis C1. This balancing of the weight about the first axis C1 can reduce generation of vibrations in the electronic device 2 when the rotating body including the cylindrical roller 40 and the battery 80 is rotated about the first axis C1.

Figure 10:
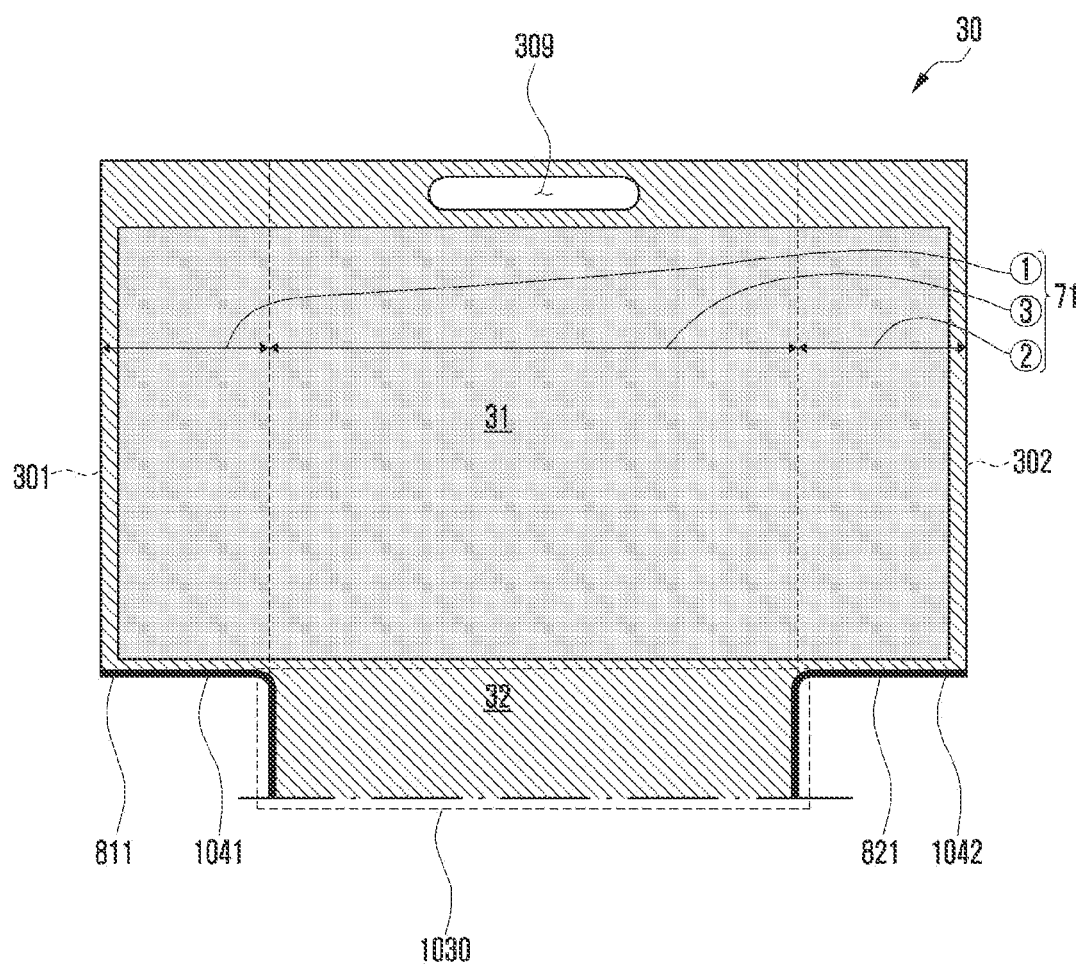
FIG. 10 is a plan view of the flexible display module, in an unfolded state, included in the electronic device of FIG. 2 according to another embodiment.

FIG. 10 is a plan view of the flexible display module 30, in an unfolded state, included in the electronic device 2 of FIG. 2 according to another embodiment.

With reference to FIG. 10, in one embodiment, compared with the example of FIG. 5, the flexible display module 30 may be implemented in a form where the neck part 1030 is expanded while replacing the third part 73 or reducing the size of the third part 73. In one embodiment, the flexible display module 30 may include a first reinforcing member (or, first protection member) 1041 disposed along the first side surface 301 in correspondence to the first rim 811 and the neck part 1030. The flexible display module 30 may include a second reinforcing member (or, second protection member) 1042 disposed along the second side surface 302 in correspondence to the second rim 821 and the neck part 1030. The first reinforcing member 1041 and/or the second reinforcing member 1042 may be implemented to reduce a decrease in flexuosity of the flexible display module 30. The first reinforcing member 1041 and/or the second reinforcing member 1042 may include, for example, a coating layer. In a certain embodiment, the first reinforcing member 1041 and/or the second reinforcing member 1042 may include a film adhered using an adhesive material. In a certain embodiment, the first reinforcing member 1041 and/or the second reinforcing member 1042 may be separately prepared and disposed or coupled to the flexible display module 30. The first reinforcing member 1041 and/or the second reinforcing member 1042 may include, for example, a metal or a polymer. The first reinforcing member 1041 (e.g., coating layer) may contribute to preventing the flexible display module 30 from being damaged by reducing the stress generated in the first rim 811 or the neck part 1030 when a force or motion is transferred to the flexible display module 30. The second reinforcing member 1042 (e.g., coating layer) may contribute to preventing the flexible display module 30 from being damaged by reducing the stress generated in the second rim 821 or the neck part 1030 when a force or motion is transferred to the flexible display module 30.

Figure 11:
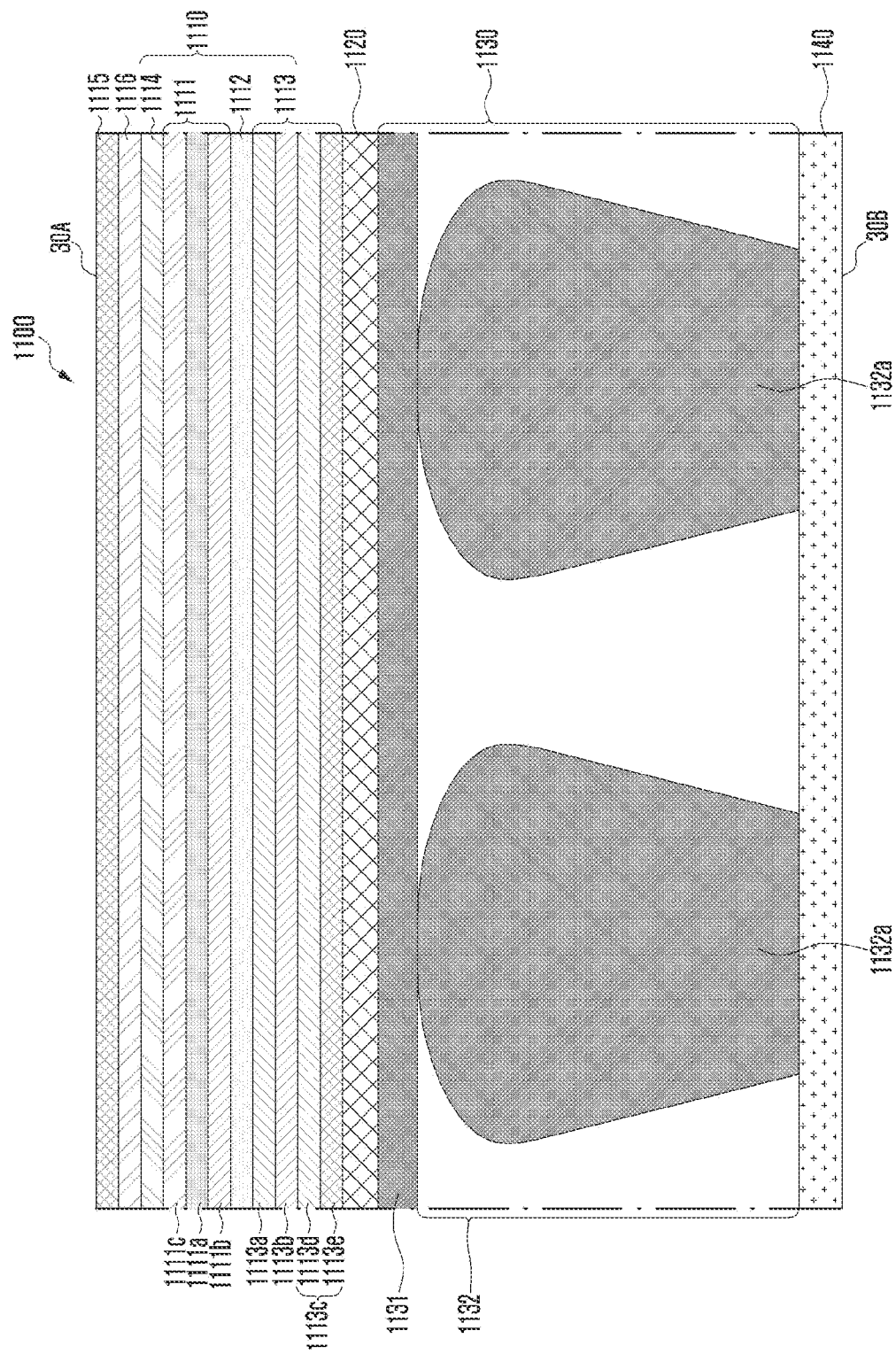
FIG. 11 illustrates a cross-sectional structure of the flexible display module of FIG. 3 according to an embodiment.
Figure 12:
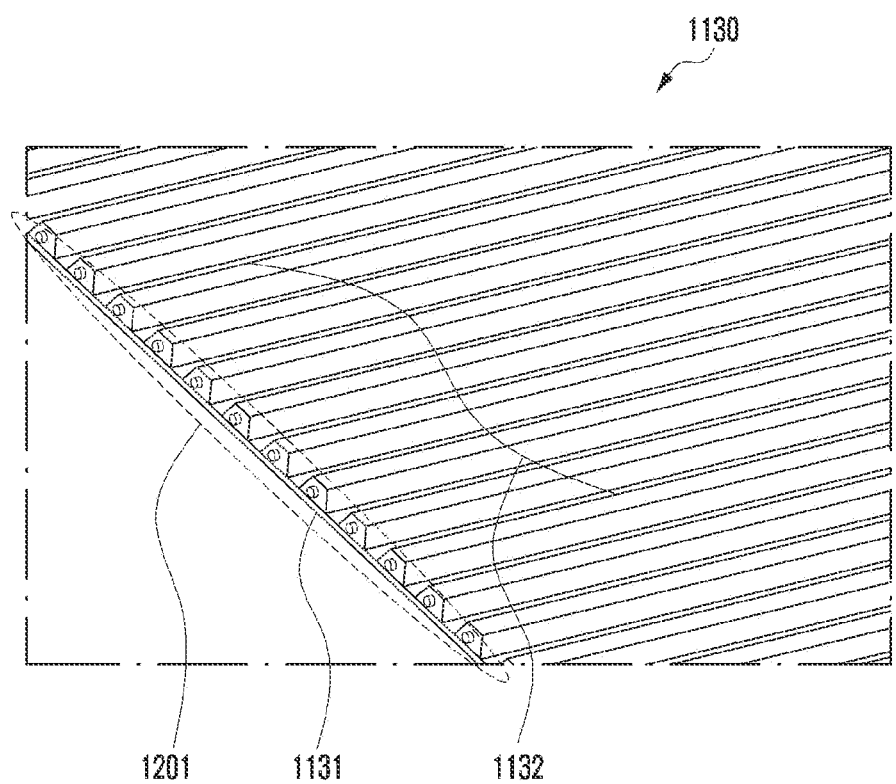
FIG. 12 illustrates a display support structure according to an embodiment.

FIG. 11 illustrates a cross-sectional structure 1100 of the flexible display module 30 of FIG. 3 according to an embodiment. FIG. 12 illustrates a display support structure 1130 according to an embodiment.

With reference to FIGS. 11 and 12, in one embodiment, the flexible display module (or, flexible display assembly) 30 may include a flexible display 1110, a support sheet 1120, a display support structure 1130, and/or a back cover 1140.

According to an embodiment, the display support structure 1130 may be disposed on or coupled to the rear surface of the flexible display 1110. The display support structure 1130 may, for example, allow the flexible display 1110 to be movable while maintaining a smoothly connected shape. In one embodiment, the display support structure 1130 may include a multi-bar structure (or, multi-bar assembly). In one embodiment, the display support structure (e.g., multi-bar structure) 1130 may include a first layer 1131, and a second layer 1132 including a plurality of support bars (or, multi-support bars) 1132a. The first layer 131 may be positioned between the support sheet 1120 and the second layer 1132. The first layer 1131 may be in the form of a film or a sheet having flexuosity. The plurality of support bars 1132a may be extended in a direction (e.g., x-axis direction) where the first axis C1 (refer to FIGS. 2 and 3) is extended. The plurality of support bars 1132a may have substantially the same cross-sectional shape, and may be arranged at a specific separation distance from each other. In a certain embodiment, some of the plural support bars 1132a may be arranged at a first separation distance, and some others of the plural support bars 1132a may be arranged at a second separation distance different from the first separation distance. The display support structure 1130 may have flexuosity due to the form in which the plural support bars 1132*a* are separated and disposed on the first layer 1131 and the flexibility of the first layer 1131. The first layer 1131 may include first regions in which the plural support bars 1132*a* are disposed, and second regions between the first regions. The display support structure 1130 may be substantially bent due to the second regions. The plural support bars 1132*a* may have a cross-sectional shape (e.g., trapezoidal shape) that narrows in a direction from the front surface 30A of the flexible display module 30 to the rear surface 30B of the flexible display module 30. This cross-sectional shape may contribute to bending the display support structure 1130 with a smaller bend radius. The cross-sectional shape of the plural support bars 1132*a* may be various without being limited to the illustrated embodiment.

According to an embodiment, the first layer 1131 and the second layer 1132 may include the same material. For example, the first layer 1131 and the second layer 1132 may be integrally formed. As another example, the display support structure 1130 may be implemented by separately forming the first layer 1131 and the second layer 1132 and then combining them together.

According to a certain embodiment, the first layer 1131 and the second layer 1132 may include different materials. Compared with a first material included in the first layer 1131, a second material included in the second layer 1132 may have greater strength or greater rigidity (or, stiffness property).

According to an embodiment, the first layer 1131 and the second layer 1132 may include a metal material. For example, the first layer 1131 and the second layer 1132 may include the same metal material. As another example, the first layer 1131 may include a first metal material, and the second layer 1132 may include the first metal material and a second metal material. The first metal material of the first layer 1131 may include a material having a binding affinity with the support sheet 1120 and the second metal material of the second layer 1132.

According to a certain embodiment, the first layer 1131 may include a first polymer, and the second layer 1132 may include a second polymer different from the first polymer. The first polymer included in the first layer 1131 may have greater softness (or softness property) than the second polymer included in the second layer 1132. The first polymer may be various, such as polyester (PET), polyimide (PI), or thermoplastic polyurethane (TPU). The first polymer may contribute to the bonding force between the support sheet 1120 and the second layer 1132, and to the durability of the display support structure 1130. The first polymer may include a material having a binding affinity with the support sheet 1120 and the second polymer of the second layer 1132. The first layer 1131 may be formed to have a thickness to secure the bending property of the display support structure 1130 according to the softness property of the first polymer. The second polymer included in the second layer 1132 may have greater strength or greater rigidity (or, stiffness property) than the first polymer included in the first layer 1131. The second polymer may include, for example, engineering plastic (e.g., polycarbonate (PC) or polymethyl methacrylate (PMMA)). As another example, the second polymer may include a material (e.g., fiber reinforced plastic (FRP)) obtained by mixing engineering plastic with various reinforcing materials such as fiberglass or carbon fiber.

According to a certain embodiment, the first layer 1131 may include a polymer, and the second layer 1132 may include a metal material. In this case, to increase the mechanical bonding force between the first layer 1131 and the second layer 1132, a coupling structure in which a portion of the first layer 1131 is positioned in a hole or groove formed in the second layer 1132 may be included (e.g., anchor effect).

According to a certain embodiment, a rail part for guiding the movement of the flexible display module 30 may be implemented. The rail part may include, for example, a first guide rail (not shown) formed in the housing 20 (see FIG. 2) in correspondence to one end portion 1201 (see FIG. 12) of the plural support bars 1132*a*, and a second guide rail (not shown) formed in the housing 20 in correspondence to the other end portion (not shown) of the plural support bars 1132*a*. The first guide rail and the second guide rail may include a groove or a recess corresponding to the movement path of the display support structure. One side portion 1201 of the plural support bars 1132*a* may be positioned or inserted in the first guide rail, and the other side portion (not shown) of the plural support bars 1132*a* may be positioned or inserted in the second guide rail. The display support structure may be moved while being guided by the first guide rail and the second guide rail. In a certain embodiment, a rotating member (e.g., rolling member such as a bearing) may be disposed on one end portion 1201 and the other end portion of the plural support bars 1132*a*.

According to an embodiment, the support sheet 1120 may be disposed on or coupled to the rear surface of the flexible display 1110. The support sheet 1120 may contribute to the durability of the flexible display 1110. The support sheet 1120 may reduce the influence of a load or stress that may occur when the flexible display module 30 is moved, on the flexible display 1110. The support sheet 1120 may prevent the flexible display 1110 from being damaged by a force transferred when the flexible display 1110 is moved. The support sheet 1120 may include a lattice structure. The lattice structure may include, for example, a plurality of openings (or slits). For example, the plurality of openings may be formed periodically, and may have substantially the same shape and may be repeatedly arranged at regular intervals. The lattice structure may contribute to the flexuosity of the flexible display 1110. In a certain embodiment, the support sheet 1120 may include a recess pattern (not shown) including a plurality of recesses in place of a lattice structure. In a certain embodiment, the support sheet 1120 including a lattice structure or recess pattern, or a corresponding conductive member may be formed as a plurality of layers. In a certain embodiment, the first layer 1131 of the display support structure 1130 may be omitted, and the support sheet 1120 may replace the first layer 1131 in this case. In a certain embodiment, the display support structure 1130 or the first layer 1131 may serve as a support sheet 1120, and the support sheet 1120 may be omitted in this case.

In one embodiment, with reference to FIG. 8, when the first region ① of the screen part 71 is bent by the first rotation member 51 and the second region ② of the screen part 71 is bent by the second rotation member 61, the support sheet 1120 may contribute to allowing the screen part 71 to be bent in a specific bending shape in a direction of the second axis C2 in response to the elasticity of the screen part 71.

According to an embodiment, the flexible display 1110 may be coupled to a transparent cover 1115 by using an optically transparent adhesive member 1116 (e.g., optical clear adhesive (OCA), optical clear resin (OCR), or super view resin (SVR)). The transparent cover 1115 (e.g., window) may protect the flexible display 1110 from the outside by covering the flexible display 1110. The transparent cover 1115 may be implemented in the form of a flexible thin film (e.g., thin film layer). The transparent cover 1115 may include, for example, a plastic film (e.g., polyimide film) or thin-film glass (e.g., ultra-thin glass). In a certain embodiment, the transparent cover 1115 may include a plurality of layers. For example, the transparent cover 1115 may have a form in which various coating layers are arranged on a plastic film or thin-film glass. For example, the transparent cover 1115 may have a form in which at least one protective layer or coating layer containing a polymer material (e.g., polyester (PET), polyimide (PI), or thermoplastic polyurethane (TPU)) is disposed on a plastic film or thin-film glass.

The flexible display 1110 may include, for example, a display panel 1111, a base film 1112, a lower panel 1113, or an optical layer 1114. The display panel 1111 may be positioned between the optical layer 1114 and the base film 1112. The base film 1112 may be positioned between the display panel 1111 and the lower panel 1113. The optical layer 1114 may be positioned between the optically transparent adhesive member 1116 and the display panel 1111. An adhesive member (not shown) of various polymers may be arranged between the display panel 1111 and the base film 1112, between the base film 1112 and the lower panel 1113, and/or between the display panel 1111 and the optical layer 1114. The display panel 1111 may include, for example, a light emitting layer 1111a, a thin film transistor (TFT) film 1111b, and/or an encapsulation layer (e.g., thin-film encapsulation (TFE)) 1111c. The light emitting layer 1111a may include a plurality of pixels implemented with light emitting elements such as OLEDs or micro LEDs. The light emitting layer 1111a may be disposed on the TFT film 1111b through organic material evaporation. The TFT film 1111b may be positioned between the light emitting layer 1111a and the base film 1112. The TFT film 1111b may refer to a film structure in which at least one TFT is disposed on a flexible substrate (e.g., PI film) through a series of processes such as deposition, patterning, and etching. The at least one TFT may control a current to a light emitting element of the light emitting layer 1111a to turn on or off a pixel or adjust the brightness of the pixel. The at least one TFT may be implemented with, for example, amorphous silicon (a-Si) TFT, liquid crystalline polymer (LCP) TFT, low-temperature polycrystalline oxide (LTPO) TFT, or low-temperature polycrystalline silicon (LTPS) TFT. The display panel 1111 may include a storage capacitor, and the storage capacitor may maintain a voltage signal in the pixel, maintain the voltage applied to the pixel for one frame, or reduce a change in the gate voltage of the TFT due to a leakage current during a light emission time. By a routine (e.g., initialization, data write) for controlling at least one TFT, the storage capacitor may maintain the voltage applied to the pixel at a preset time interval. In one embodiment, the display panel 1111 may be implemented based on OLEDs, and the encapsulation layer 1111c may cover the light emitting layer 1111a. Since organic materials and electrodes that emit light in OLEDs are very sensitive to oxygen and/or moisture and may lose their luminescent properties, to prevent this, the encapsulation layer 1111c may seal the light emitting layer 1111a so that oxygen and/or moisture do not penetrate into the OLEDs. The base film 1112 may include a flexible film made of a polymer such as polyimide or polyester (PET), or plastic. The base film 1112 may serve to support and protect the display panel 1111. In a certain embodiment, the base film 1112 may be referred to as a protective film, a back film, or a back plate.

The lower panel 1113 may include a plurality of layers for various functions. An adhesive member (not shown) of various polymers may be disposed between the plurality of layers included in the lower panel 1113. The lower panel 1113 may include, for example, a light blocking layer 1113a, a buffer layer 1113b, or a lower layer 1113c. The light blocking layer 1113a may be positioned between the base film 1112 and the buffer layer 1113b. The buffer layer 1113b may be positioned between the light blocking layer 1113a and the lower layer 1113c. The light blocking layer 1113a may at least partially block light incident from the outside. For example, the light blocking layer 1113a may include an emboss layer. The emboss layer may be a black layer including a bumpy pattern. The buffer layer 1113b may mitigate an external shock applied to the flexible display 1110. For example, the buffer layer 1113b may include a sponge layer or a cushion layer. The lower layer 1113c may diffuse, disperse, or dissipate heat generated in the electronic device 2 (refer to FIG. 2) or the flexible display 1110. The lower layer 1113c may absorb or shield electromagnetic waves. The lower layer 1113c may mitigate an external shock applied to the electronic device 2 or the flexible display 1110. For example, the lower layer 1113c may include a composite sheet 1113d or a conductive sheet 1113e. In one embodiment, the composite sheet 1113d may be a sheet processed by combining layers or sheets having different properties. For example, the composite sheet 1113d may include at least one of polyimide or graphite. The composite sheet 1113d may be replaced with a single sheet including one material (e.g., polyimide or graphite). The composite sheet 1113d may be positioned between the buffer layer 1113b and the conductive sheet 1113e. The conductive sheet 1113e may serve to shield electromagnetic interference (EMI) for the flexible display 1110. The conductive sheet 1113e may include various different metal materials (e.g., copper). In a certain embodiment, at least a portion of the lower layer 1113c, as a conductive member (e.g., metal plate), may help to reinforce the rigidity of the flexible display module 30, may shield ambient noise, and can be used to dissipate heat emitted from surrounding heat dissipating components (e.g., display driving circuit (e.g., DDI)). The conductive member may include, for example, at least one of copper (Cu), aluminum (Al), stainless steel (SUS), or CLAD (e.g., laminated member in which SUS and Al are alternately disposed). The lower layer 1113c may include various layers for various other functions. According to various embodiments (not shown), at least one additional polymer layer (e.g., layer including PI, PET, or TPU) other than the base film 1112 may be disposed on the rear surface of the display panel 1111. In various embodiments, at least one of the plural layers included in the lower panel 1113 (e.g., light blocking layer 1113a, buffer layer 1113b, composite sheet 1113d, and conductive sheet 1113e) may be omitted. In various embodiments, the arrangement order of the plural layers included in the lower panel 1113 may be variously changed without being limited to the embodiment of FIG. 11.

The optical layer 1114 may include, for example, a polarizing layer (or polarizer), or a phase retardation layer (or retarder). The polarizing layer and the phase retardation layer can improve the outdoor visibility of the screen. The optical layer 1114 may selectively transmit light that is generated from, for example, a light source of the display panel 1111 and vibrates in a specific direction. In a certain embodiment, one layer in which the polarizing layer and the phase retardation layer are combined may be provided, and this layer may be defined as 'circular polarizing layer'. The optically transparent adhesive member 1116 may be positioned between the transparent cover 1115 and the optical layer 1114. In a certain embodiment, the polarizing layer (or, circular polarizing layer) may be omitted, and a black pixel define layer (PDL) and/or a color filter may be included in place of the polarizing layer in this case. The electronic device 2 (refer to FIG. 2) may include a touch sensing circuit (e.g., touch sensor) (not shown). The touch sensing circuit may be implemented with a transparent conductive layer (or film) based on various conductive materials such as indium tin oxide (ITO). In a certain embodiment, the touch sensing circuit may be disposed between the transparent cover 1115 and the optical layer 1114 (e.g., add-on type). In another embodiment, the touch sensing circuit may be disposed between the optical layer 1114 and the display panel 1111 (e.g., on-cell type). In another embodiment, the display panel 1111 may include a touch sensing circuit or a touch sensing function (e.g., in-cell type). In a certain embodiment, the display panel 1111 may be based on OLEDs and may include an encapsulation layer 1111c disposed between the light emitting layer 1111a and the optical layer 1114. The encapsulation layer 1111c may serve as a pixel protection layer for protecting plural pixels of the light emitting layer 1111a. In one embodiment (not shown), the flexible display 1110 may include a conductive pattern such as a metal mesh (e.g., aluminum metal mesh) as a touch sensing circuit disposed in the encapsulation layer 1111c between the encapsulation layer 1111c and the optical layer 1114. For example, in response to the bending of the flexible display 1110, the metal mesh may have greater durability than a transparent conductive layer implemented with ITO. In a certain embodiment, the flexible display 1110 may further include a pressure sensor (not shown) capable of measuring the intensity (pressure) of a touch. Plural layers included in the display panel 1111 or the lower panel 1113, the stacking structure or the stacking order thereof may be various. The flexible display 1110 may be implemented by omitting some of the components or adding other components according to the provision form or the convergence trend of the flexible display.

According to an embodiment, the back cover 1140 may have flexibility and may constitute the rear surface 30B of the flexible display module 30. The back cover 1140 may make at least one component (e.g., display support structure 1130) of the flexible display module 30 substantially invisible to the rear surface 30B. For example, the back cover 1140 may be formed to be substantially opaque. In one embodiment, the back cover 1140 may be coupled to the display support structure 1130 by using an adhesive material. In a certain embodiment, to secure the flexuosity of the flexible display module 30 or reduce stress generated in at least one component included in the flexible display module 30 upon bending, the back cover 1140 and the display support structure 1130 may be disposed in an uncoupled state. In a certain embodiment, a lubricant (e.g., grease) may be positioned between the back cover 1140 and the display support structure 1130. In a certain embodiment, the back cover 1140 may be omitted.

Figure 13:
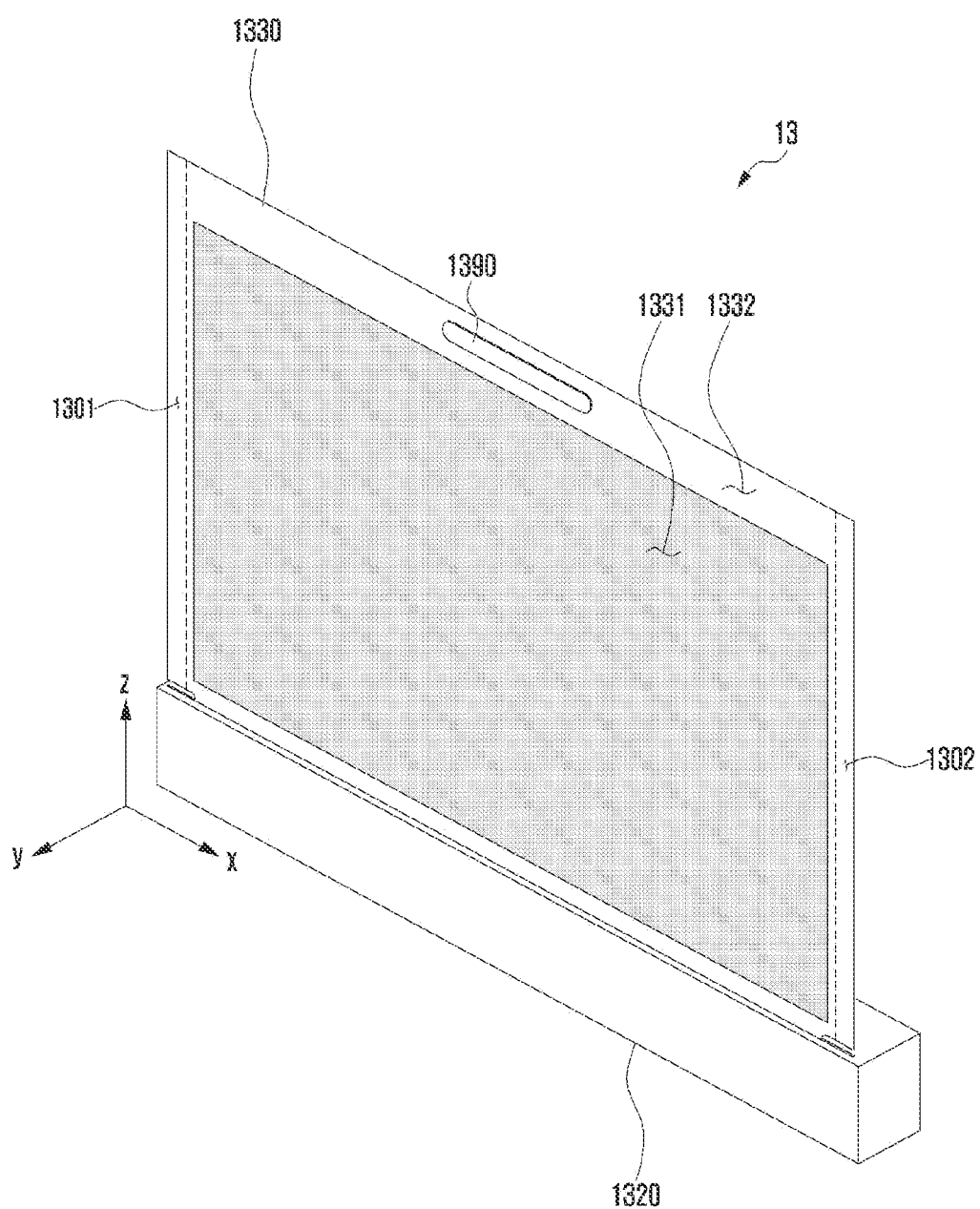
FIGS. 13 and 14 illustrate an electronic device according to another embodiment.
Figure 14:
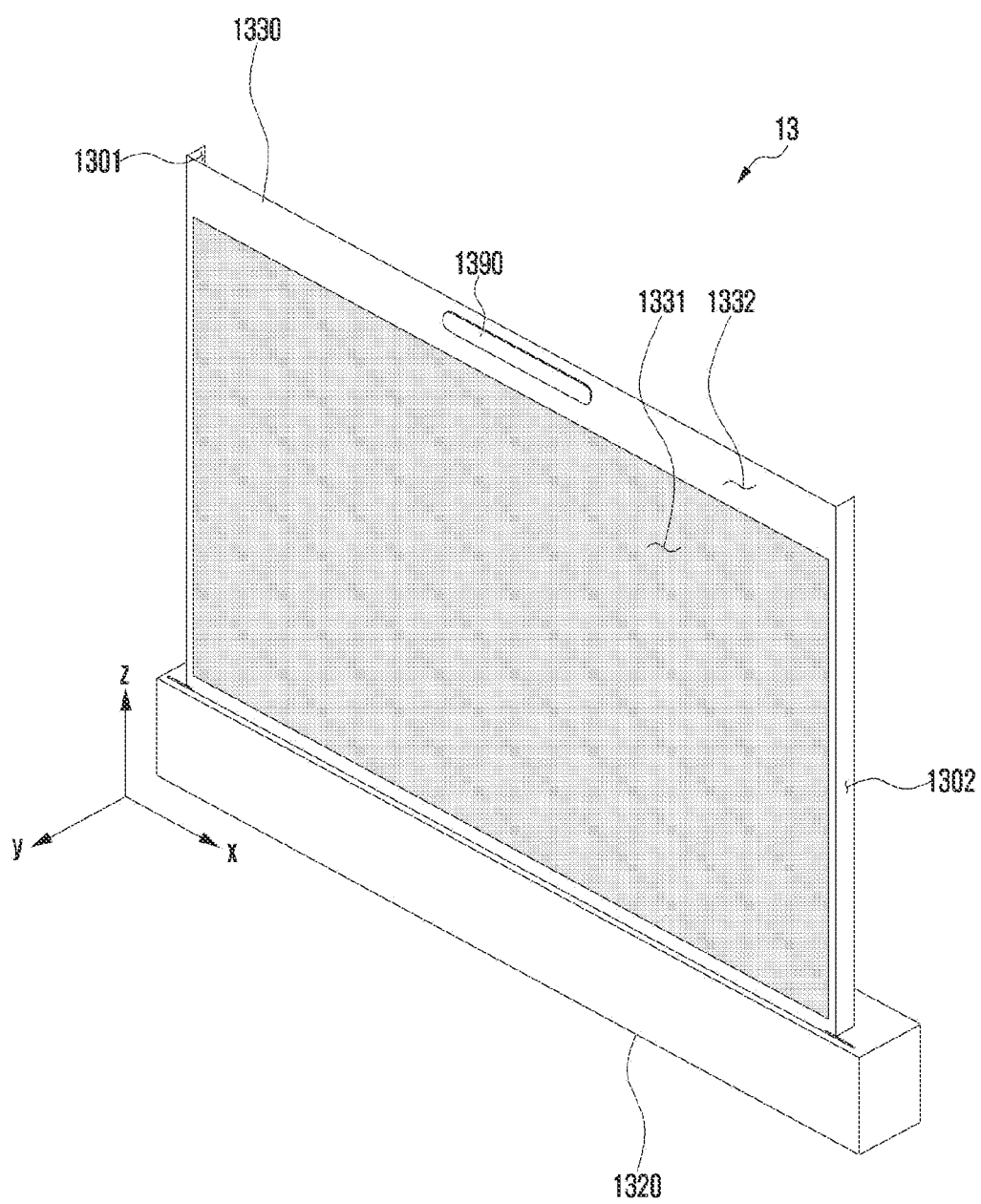

FIGS. 13 and 14 illustrate an electronic device 13 according to another embodiment.

The electronic device 13 according to the example of FIGS. 13 and 14 may include, for example, at least some of the components included in the electronic device 2 of FIG. 2, or may be implemented by changing or modifying some of the components included in the electronic device 2 of FIG. 2. With reference to FIGS. 13 and 14, the electronic device 13 may include a housing 1320, a flexible display module 1330, or a handle 1390. In one embodiment, in a state where the flexible display module 1330 is drawn out of the housing 1320 so that the display area 1331 is fully exposed to the outside (see FIG. 13), by applying an external force to the handle 1390, a first bendable portion 1301 and a second bendable portion 1302 formed in the non-display area 1332 may be bent as shown in FIG. 14. The interference between the first bendable portion 1301 and the housing 1320, and/or the interference between the second bendable portion 1302 and the housing 1320 may prevent the flexible display module 1330 from being introduced into the internal space of the housing 1320.

According to an embodiment of this document, an electronic device (e.g., electronic device 2 in FIG. 2) may include a housing (e.g., housing 20 in FIG. 2). The electronic device may include a flexible display (e.g., flexible display 1110 in FIG. 11). The flexible display may be positioned in the internal space of the housing while at least some region is being rolled in a substantially circular shape around a first axis (e.g., first axis C1 in FIG. 2). When drawn out of the housing by a specified movement distance, the flexible display may be bent to interfere with the housing so as not to be introduced into the internal space of the housing.

According to an embodiment of this document, when drawn out of the housing by a specified movement distance, the flexible display may be bent with respect to a second axis (e.g., second axis C2 in FIG. 8) perpendicular to the first axis (e.g., first axis C1 in FIG. 8).

According to an embodiment of this document, the flexible display may include a display area (e.g., display area 31 in FIG. 5) and a non-display area (e.g., non-display area 32 in FIG. 5). When the flexible display is drawn out of the housing by a specified movement distance, the display area may be fully exposed to the outside.

According to an embodiment of this document, the flexible display may include a notch (e.g., first notch 810 or second notch 820 in FIG. 5) formed in the non-display area (e.g., non-display area 32 in FIG. 5). When the flexible display is drawn out of the housing (e.g., housing 20 in FIG. 8) by a specified movement distance, a section of the flexible display corresponding to the notch may be bent to interfere with the housing so that the flexible display is not introduced into the internal space of the housing.

According to an embodiment of this document, the notch may include a first notch (e.g., first notch 810 in FIG. 5) and a second notch (e.g., second notch 820 in FIG. 5). The first notch may be formed on one side surface (e.g., first side surface 301 in FIG. 5) of the flexible display facing in a direction of the first axis (e.g., first axis C1 in FIG. 2). The second notch may be formed on the other side surface of the flexible display (e.g., second side surface 302 in FIG. 5) and may be positioned on the opposite side of the first notch.

According to an embodiment of this document, the housing (e.g., housing 20 in FIG. 3) may include an opening (e.g., opening 204 in FIG. 3) through which the flexible display is introduced in or drawn out. When the flexible display is drawn out of the housing by a specified movement distance, a part (e.g., neck part 72 in FIG. 5) of the flexible display between the first notch (e.g., first notch 810 in FIG. 5) and the second notch (e.g., second notch 820 in FIG. 5) may be located at the opening (e.g., opening 204 in FIG. 3).

According to an embodiment of this document, the electronic device may further include a bending mechanism (e.g., first bending mechanism 50 or second bending mechanism 60 in FIG. 2). When the flexible display is drawn out of the housing by a specified movement distance, the bending mechanism may bend the part of the flexible display corresponding to the notch (e.g., first notch 810 or second notch 820 in FIG. 5).

According to an embodiment of this document, the bending mechanism (e.g., first bending mechanism 50 or second bending mechanism 60 in FIG. 2) may include a rotation member (e.g., first rotation member 51 or second rotation member 61 in FIG. 2) that presses the rear surface of the part of the flexible display corresponding to the notch (e.g., first notch 810 or second notch 820 in FIG. 5).

According to an embodiment of this document, the electronic device may further include a coating layer (e.g., first reinforcing member 910 or second reinforcing member 920 in FIG. 5) disposed in the notch (e.g., first notch 810 or second notch 820 in FIG. 5).

According to an embodiment of this document, the electronic device may further include an elastic structure that maintains a force for introducing the flexible display into the internal space of the housing.

According to an embodiment of this document, the electronic device may further include a cylindrical roller (e.g., cylindrical roller 40 in FIG. 3) positioned in the internal space where the flexible display is rolled. The elastic structure may be operably connected to a cylindrical roller.

According to an embodiment of this document, the electronic device may further include a multi-bar structure (e.g., display support structure 1130 in FIG. 11) disposed on the rear surface of the flexible display.

The embodiments disclosed in this document and drawings are presented as specific examples to easily explain technical contents of the embodiments and help understanding thereof, and are not intended to limit the scope of the embodiments. Accordingly, the scope of various embodiments of the present document should be construed to include not only the embodiments disclosed herein but also all changes or modifications derived based on the technical idea thereof Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a housing;
a control circuit;
a flexible display configured to be rolled with respect to a first axis in an internal space of the housing, wherein the flexible display includes a first part comprising a display area and configured to be drawn out of the housing; and
a rotation member, electrically connected to the control circuit, configured to press the first part of the flexible display in response to a control signal from the control circuit when the first part of the flexible display is drawn out of the housing, such that the first part of the flexible display is bent with respect to a second axis perpendicular to the first axis.

2. The electronic device of claim 1, wherein:
the flexible display includes a second part and a third part, the second part extending the first part, and the third part between the first part and the third part; and
the second part has a width that is narrower than each of a width of the first part and a width of the third part so that the flexible display has first and second notches between the first part and the third part, and the first and second notches are arranged with the second part therebetween.

3. The electronic device of claim 2, further comprising a first coating layer for reinforcement disposed in the first notch and a second coating layer for reinforcement disposed in the second notch.

4. The electronic device of claim 2, wherein:
the first part of the flexible display includes a first area, a second area, and a third area between the first area and the second area;
the first notch is formed between the first area and the third part;
the second notch is formed between the second area and third part; and
the rotation member is configured to press the first area and the second area so as to bend the first part with respect to the second axis when the first part is drawn out the housing.

5. The electronic device of claim 4, wherein:
the housing includes an opening where the first part of the flexible display is drawn out of the housing;
a first rim, included in the first area, of the first notch faces to a periphery surface of the opening of the housing when the first part of the flexible display is drawn out of the housing and bent with respect to the second axis; and
a second rim, included in the second area, of the second notch faces to the periphery surface of the opening of the housing when the first part of the flexible display is drawn out of the housing and bent with respect to the second axis.

6. The electronic device of claim 1, wherein:
the flexible display includes a second part extending from the first part, the first part including a first area, a second area, and a third area between the first area and the second area; and
the second part is extended from the third area of the first part so as to have a width that is narrower than a width of the first part.

7. The electronic device of claim 6, wherein the rotation member is configured to press the first area and the second area so as to bend the first part with respect to the second axis when the first part is drawn out the housing.

8. The electronic device of claim 7, wherein:
the housing includes an opening where the first part of the flexible display is drawn out of the housing;
a first rim of the first area faces to a periphery surface of the opening of the housing when the first part of the flexible display is drawn out of the housing and bent with respect to the second axis; and
a second rim of the second area faces to the periphery surface of the opening of the housing when the first part of the flexible display is drawn out of the housing and bent with respect to the second axis.

9. The electronic device of claim 6, further comprising:
a first coating layer for reinforcement disposed in a first rim of the first area of the first part and one side rim of the second part extending the first rim, wherein the first rim faces to the housing when the first part of the flexible display is drawn out of the housing and bent with respect to the second axis; and
a second coating layer for reinforcement disposed in a second rim of the second area of the first part and other side rim of the second part extending the second rim, wherein the second rim faces to the housing when the first part of the flexible display is drawn out of the housing and bent with respect to the second axis.

10. The electronic device of claim 1, further comprising an elastic structure configured to maintain a force for introducing the flexible display into the internal space of the housing.

11. The electronic device of claim 1, further comprising a cylindrical roller where the flexible display is rolled, and having the first axis.

12. The electronic device of claim 1, further comprising a multi-bar structure disposed on a rear surface of the flexible display.

13. The electronic device of claim 1, wherein when the first part of the flexible display is drawn out of the housing and bent with respect to the second axis, the bent first part of the flexible display is configured to interfere with the housing so as not to be introduced into the internal space of the housing.

14. An electronic device comprising:
a housing; and
a flexible display configured to be rolled with respect to a first axis in an internal space of the housing,
wherein when the flexible display is drawn out of the housing by a specified movement distance, the flexible display is bent with respect to a second axis perpendicular to the first axis to interfere with the housing so as not to be introduced into the internal space of the housing,
wherein the flexible display includes a notch formed in a non-display area, and
wherein a part of the flexible display corresponding to the notch is configured to bend to interfere with the housing so as not to be introduced into the internal space of the housing when the flexible display is drawn out of the housing by the specified movement distance.

15. The electronic device of claim 14, wherein a display area of the display is fully exposed to an outside when flexible display is drawn out of the housing by the specified movement distance.

16. The electronic device of claim 14, wherein the notch includes:
a first notch that is formed on one side surface of the flexible display, the one side surface facing in a direction of the first axis; and
a second notch that is formed on another side surface of the flexible display facing in an opposite direction as the one side surface and is positioned opposite to the first notch.

17. The electronic device of claim 14, further comprising a bending mechanism configured to bend the part of the flexible display corresponding to the notch when the flexible display is drawn out of the housing by the specified movement distance.

18. The electronic device of claim 17, wherein the bending mechanism includes a rotation member configured to press a rear surface of the part of the flexible display corresponding to the notch.

19. The electronic device of claim 14, further comprising a coating layer disposed in the notch.

20. The electronic device of claim 14, further comprising:
an elastic structure configured to maintain a force for introducing the flexible display into the internal space of the housing; and
a cylindrical roller positioned in the internal space where the flexible display is rolled, and wherein the elastic structure is operably connected to a cylindrical roller.

* * * * *